US012356903B2

(12) United States Patent
Meltzer et al.

(10) Patent No.: US 12,356,903 B2
(45) Date of Patent: Jul. 15, 2025

(54) SYSTEMS AND METHODS FOR PREDICTING CROP SIZE AND YIELD

(71) Applicant: Aerobotics (Pty) Ltd, Cape Town (ZA)

(72) Inventors: Benjamin Meltzer, Cape Town (ZA); Michael Wootton, Cape Town (ZA); James Paterson, Los Angeles, CA (US); Munsanje Mweene, Cape Town (ZA); Joshua Washington Perry, Cape Town (ZA)

(73) Assignee: Aerobotics (Pty) Ltd, Cape Town (ZA)

( * ) Notice: Subject to any disclaimer, the term of this patent is extended or adjusted under 35 U.S.C. 154(b) by 0 days.

(21) Appl. No.: 18/532,071

(22) Filed: Dec. 7, 2023

(65) Prior Publication Data

US 2024/0116630 A1    Apr. 11, 2024

Related U.S. Application Data

(63) Continuation of application No. 17/206,064, filed on Mar. 18, 2021, now abandoned, which is a
(Continued)

(51) Int. Cl.
*A01G 22/05*    (2018.01)
*A01G 17/00*    (2006.01)
(Continued)

(52) U.S. Cl.
CPC ........... *A01G 22/05* (2018.02); *A01G 17/005* (2013.01); *G06F 18/214* (2023.01); *G06F 18/23* (2023.01);
(Continued)

(58) Field of Classification Search
CPC .................. G06V 20/188; G06V 20/68; G06T 2207/30188; A01B 79/005
See application file for complete search history.

(56) References Cited

U.S. PATENT DOCUMENTS 9,922,261 B2   3/2018   Isler et al.
10,255,670 B1  4/2019   Wu et al.
(Continued)

FOREIGN PATENT DOCUMENTS

EP        3125151 A2      2/2017
WO    WO2019/032648 A1    2/2019

OTHER PUBLICATIONS

Aerobotics (PTY) Ltd., International Search Report and Written Opinion, PCT/US2021/020038, May 21, 2021, 13 pgs.
(Continued)

*Primary Examiner* — Raphael Schwartz
(74) *Attorney, Agent, or Firm* — Morgan, Lewis & Bockius LLP

(57) ABSTRACT

Methods for predicting a yield of fruit growing in an agricultural plot are provided. At a first time, a first plurality of images of a canopy of the agricultural plot is obtained from an aerial view of the canopy of the agricultural plot. From the first plurality of images, a first number of detectable fruit is estimated. At a second time, a second plurality of images of the canopy of the agricultural plot is obtained from the aerial view of the canopy of the agricultural plot. From the second plurality of images, a second number of detectable fruit is estimated. Using at least the first number of detectable fruit and the second number of detectable fruit and agricultural plot information, predict the yield of fruit from the agricultural plot.

18 Claims, 13 Drawing Sheets

Related U.S. Application Data continuation of application No. PCT/US2021/020038, filed on Feb. 26, 2021.

(60) Provisional application No. 62/988,213, filed on Mar. 11, 2020.

(51) Int. Cl.

| | |
|---|---|
| *B64U 101/30* | (2023.01) |
| *B64U 101/40* | (2023.01) |
| *G06F 18/214* | (2023.01) |
| *G06F 18/23* | (2023.01) |
| *G06F 18/2411* | (2023.01) |
| *G06F 18/2453* | (2023.01) |
| *G06N 3/08* | (2023.01) |
| *G06N 5/01* | (2023.01) |
| *G06N 20/10* | (2019.01) |
| *G06V 10/764* | (2022.01) |
| *G06V 10/771* | (2022.01) |
| *G06V 10/80* | (2022.01) |
| *G06V 10/82* | (2022.01) |
| *G06V 20/10* | (2022.01) |
| *G06V 20/17* | (2022.01) |
| *G06V 20/68* | (2022.01) |

(52) U.S. Cl.
CPC ...... *G06F 18/2411* (2023.01); *G06F 18/2453* (2023.01); *G06N 3/08* (2013.01); *G06N 5/01* (2023.01); *G06N 20/10* (2019.01); *G06V 10/764* (2022.01); *G06V 10/771* (2022.01); *G06V 10/806* (2022.01); *G06V 10/82* (2022.01); *G06V 20/10* (2022.01); *G06V 20/17* (2022.01); *G06V 20/188* (2022.01); *B64U 2101/30* (2023.01); *B64U 2101/40* (2023.01); *G06T 2207/30128* (2013.01); *G06T 2207/30188* (2013.01); *G06V 20/68* (2022.01)

(56) References Cited

U.S. PATENT DOCUMENTS

| | | |
|---|---|---|
| 2004/0264761 A1 | 12/2004 | Mas et al. |
| 2008/0260237 A1 | 10/2008 | Savolainen et al. |
| 2010/0198775 A1 | 8/2010 | Rousselle et al. |
| 2016/0050840 A1 | 2/2016 | Sauder et al. |
| 2016/0307329 A1* | 10/2016 | Isler .................. G06T 7/11 |
| 2017/0161560 A1* | 6/2017 | Itzhaky ............ G06Q 10/06313 |
| 2018/0293671 A1 | 10/2018 | Murr et al. |
| 2018/0300653 A1 | 10/2018 | Srinivasan et al. |
| 2018/0349715 A1 | 12/2018 | Gupta |
| 2019/0228225 A1 | 7/2019 | Guo et al. |
| 2019/0259108 A1 | 8/2019 | Bongartz et al. |
| 2019/0377946 A1 | 12/2019 | Genty et al. |
| 2020/0132651 A1 | 4/2020 | McPeek |
| 2020/0193589 A1 | 6/2020 | Peshlov et al. |
| 2020/0286282 A1* | 9/2020 | Grant .................. G06V 20/647 |
| 2021/0158041 A1 | 5/2021 | Chowdhary et al. |

OTHER PUBLICATIONS

Aerobotics (PTY) Ltd., International Search Report and Written Opinion, PCT/US2021/025647, Jul. 9, 2021, 13 pgs.

American Society of Agronomy, Drones effective tools for fruit farmers, Jan. 8, 2020, 4 pgs.

Apolo-Apolo, Deep learning techniques for estimation of the yield and size of citrus fruits using a UAV, European Journal of Agronomy, Feb. 21, 2020, 1161-0301, 11 pgs.

Malahe, Notice of Allowance, U.S. Appl. No. 17/223,895, filed Jun. 4, 2021, 15 pgs.

Dorj, An yield estimation in citrus orchards via fruit detection and counting using image processing, Computers and Electronics in Agriculture 140 (2017) May 17, 2017, 103-112, 10 pgs.

Robson, Andrew et al., "Using Worldview Satellite Imagery to Map Yield in Avocado (*Persea americana*): A Case Study in Bundaberg, Australia," MPDI, Remote Sensing in Agriculter and Vegetation, Nov. 27, 2017, downloaded from https://www.mdpi.com/2072-4292/9/12/1223/htm, 34 pgs.

Shivastava, Introduction to Online Machine Learning, Analytics Vidhya, Jan. 27, 2015 (Year: 2015), 5 pgs.

* cited by examiner

SYSTEMS AND METHODS FOR PREDICTING CROP SIZE AND YIELD

PRIORITY APPLICATIONS

This application is a continuation of U.S. application Ser. No. 17/206,064, filed Mar. 18, 2021, which is a continuation of International Application PCT/US21/20038, filed Feb. 26, 2021, which claims priority to U.S. Provisional Application 62/988,213, filed Mar. 11, 2020, each of which is hereby incorporated by reference in its entirety.

TECHNICAL FIELD

This specification describes using aerial images obtained from an agricultural plot to estimate fruit sizes (e.g., estimate a distribution of fruit sizes), predict a crop yield (e.g., using estimated fruit sizes) or other characteristics of the agricultural plot.

BACKGROUND

A perennial issue across all agriculture is the accurate prediction of fruit size and/or crop yield. Only through such estimates can farmers appropriately plan for the coming seasons (e.g., by determining appropriate pricing of their produce and making revenue predictions, which in turn affect planning for the next year). In addition, determining crop yield and when the crop will be ripe are essential for efficient harvest logistics (e.g., with regards to hiring enough labor for harvesting, negotiating fair contracts with downstream suppliers, and maximizing yield). Current methods of crop yield and/or fruit size prediction rely, in great part, on labor-intensive manual counting of individual fruit and often-inaccurate projections of crop yield from previous years.

Given the above background, robust techniques for accurately predicting fruit size and/or crop yield are needed in the art.

SUMMARY

The present disclosure addresses the shortcomings identified in the background by providing robust techniques for predicting crop yield (e.g., fruit yield) through estimations of crop (e.g., fruit) size. With improved methods of image analysis to detect individual crops and determine respective crop sizes, more accurate yield predictions are possible. Further, determination of plant and crop health metrics can also be performed via image analysis; these metrics can, in some cases, contribute to predicting crop size and/or crop yield. However, such information can be used to improve overall farming efficiency (e.g., determining whether growth conditions are optimal, if additional fertilizer and/or water is needed, etc.).

Note that, while the remainder of this document refers often to fruit size and yield, one of skill in the art having the benefit of this disclosure will understand that many of the systems and methods described herein are applicable to any crop, including non-fruit crops (lettuce, turnips, broccoli, etc.) Further, the term "fruit" should be construed to include the fruiting body of any plant. For example, walnuts, peppers, beans, and the like, are all fruit, as are oranges, apples, etc.

Further, although some embodiments of the present disclosure refer to images obtained aerially (e.g., from a unmanned aerial vehicle or a satellite), in some embodiments, ground-based imagery can be used to supplement or replace the aerial imagery. One of skill in the art having the benefit of this disclosure will understand to which embodiments ground-based imagery may be applicable.

I. Using Images from Multiple Time Points to Predict Fruit Yield and/or Fruit Size.

One aspect of the present disclosure provides a method of predicting a yield of fruit growing in an agricultural plot. The method comprises obtaining, at a first time, a first plurality of images of a canopy of the agricultural plot from an aerial view of the canopy of the agricultural plot. The method further includes estimating, from the first plurality of images of the canopy of the agricultural plot obtained from the aerial view of the canopy of the agricultural plot, a first number of fruit detectable from the first plurality of images of the canopy of the agricultural plot. The method further comprises obtaining, at a second time, a second plurality of images of the canopy of the agricultural plot from the aerial view of the canopy of the agricultural plot (note that the term "the aerial view" is not necessarily intended to suggest that the first plurality of images and the second plurality of images are obtained from the same vantage point; rather, the aerial view is simply over the agricultural plot). The method further comprises estimating, from the second plurality of images of the canopy of the agricultural plot obtained from the aerial view of the canopy of the agricultural plot, a second number of fruit detectable from the second plurality of images of the canopy of the agricultural plot. The method further comprises using at least i) the first and second number of fruit detectable from the aerial view of the canopy of the agricultural plot and ii) contextual information for the agricultural plot, to predict the yield of fruit from the agricultural plot.

II. Using Images from Multiple Locations to Predict Fruit Yield and/or Fruit Size.

Another aspect of the present disclosure provides a method of predicting a yield of fruit growing in an agricultural plot. The method comprises obtaining, using a camera, a first plurality of images of a canopy of the agricultural plot. For each respective fruit of a plurality of fruit growing in the agricultural plot, the method proceeds by identifying the respective fruit in a first respective image in the first plurality of images, wherein the first respective image has a corresponding first camera location, identifying the respective fruit in a second respective image in the first plurality of images, wherein the second respective image has a corresponding second camera location; and using at least i) the first and second respective images, and ii) a distance between the first and second camera locations, to determine a corresponding size of the respective fruit. In some embodiments, the method further comprises predicting a yield of fruit growing in the agricultural plot based at least in part on the plurality of fruit sizes.

III. Using Images with Different Resolutions to Predict Fruit Yield and/or Fruit Size.

Another aspect of the present disclosure provides a method of predicting a yield of fruit growing in an agricultural plot. The method comprises obtaining a plurality of images of a canopy of the agricultural plot from an aerial view of the canopy of the agricultural plot, where the plurality of images includes a first subset of images and a second subset of images. Each image in the first subset of images corresponds to a respective first portion of the agricultural plot. Each image in the second subset of images corresponds to a respective second portion of the agricultural plot. The second portion of the agricultural plot is smaller than the first portion of the agricultural plot (e.g., the second portion is obtained from closer, or with a higher magnification). The method further includes obtaining a first route record corresponding to the first subset of images, and a second route record corresponding to the second subset of images. The first route record comprises i) a first route over the agricultural plot for a first vehicle (e.g., an aircraft or an unmanned aerial vehicle such as a drone, a satellite, or other aircraft), and ii) a respective velocity of the first vehicle for each image in the first subset of images. The second route record comprises i) a second route over the agricultural plot for a second vehicle (e.g., an aircraft or an unmanned aerial vehicle such as a drone, a satellite, or other aircraft), and ii) a respective velocity of the second vehicle for each image in the second subset of images. The method further includes estimating, from the first subset of images of the canopy of the agricultural plot obtained from the aerial view of the canopy of the agricultural plot, a number of fruit detectable from the plurality of images of the canopy of the agricultural plot. The method proceeds by determining, from the second subset of images, for each fruit of a plurality of fruit, a respective fruit size. The method further comprises using the number of fruit detectable from the aerial view of the canopy of the agricultural plot and the plurality of fruit sizes, to predict the yield of fruit from the agricultural plot.

In accordance with some embodiments, the features described below are applicable to any one or more of the methods described above.

In some embodiments, the first plurality of images of the canopy of the agricultural plot comprises images of a plurality of plants growing in the agricultural plot. In some embodiments, the second plurality of images of the canopy of the agricultural plot comprises images of a plurality of plants growing in the agricultural plot.

In some embodiments, the method further comprises using at least a first depth of focus of the camera to determine a corresponding size of the respective fruit. In some embodiments, the method further comprises using at least a first depth of focus of the camera, a respective camera location (e.g., location from which the respective image is obtained by the respective camera), a respective image resolution, and/or a combination thereof to determine a corresponding size of the respective fruit.

In some embodiments, predicting the yield of fruit from the agricultural plot further comprises estimating a respective yield of fruit for each plant in the plurality of plants in the agricultural plot.

In some embodiments, the first plurality of images includes a first subset of images and a second subset of images. In some embodiments, each image in the first subset of images corresponds to a respective first portion of the agricultural plot, and each image in the second subset of images corresponds to a respective second portion of the agricultural plot. In some embodiments, each image in the first subset of images has a corresponding first resolution, and each image in the second subset of images has a corresponding second resolution, where the second resolution is higher than the first resolution. In some embodiments, the first subset of images is obtained at a first height and the second subset of images is obtained from a second height.

In some embodiments, the second plurality of images includes a third subset of images and a fourth subset of images. In some embodiments, each image in the third subset of images corresponds to the respective first (or a respective third) portion of the agricultural plot, and each image in the fourth subset of images corresponds to the respective second (or a respective fourth) portion of the agricultural plot. In some embodiments, each image in the third subset of images has the corresponding first (or a corresponding third) resolution, and each image in the fourth subset of images has the corresponding second (or a corresponding fourth) resolution, where the second (and/or fourth) resolution is higher than the first (and/or third) resolution. In some embodiments, the third subset of images is obtained at the first height and the fourth subset of images is obtained from the second height In some embodiments, the second portion of the agricultural plot is smaller than the first portion of the agricultural plot. In some embodiments, each of the first portion, the second portion, the third portion, and the fourth portion are different portions of the agricultural plot. In some embodiments, the first portion and the third portion are substantially the same portion (e.g., within the accuracy of the ability to control the respective vehicle, as described below). In some embodiments, the second portion and the fourth portion are substantially the same portion.

In some embodiments, resolution corresponds to a level of detail in a respective image (e.g., a high-resolution image corresponds to an image with a high-level of detail). In some embodiments, "resolution" as used herein refers to a minimum distance within an object plane (e.g., the plane of the trees/fruit) for which two points can be resolved. In some embodiments, the second resolution is different from the first resolution. In some embodiments, each of the first resolution, the second resolution, the third resolution, and the fourth resolution are different image resolutions. In some embodiments, the first resolution and the third resolution are substantially the same resolution (e.g., within the accuracy of the ability to control the respective vehicle, as described below). In some embodiments, the second resolution and the fourth resolution are substantially the same resolution.

In some embodiments, the first height is above the agricultural plot. In some embodiments, the second height is different from the first height. In some embodiments, each of the first height, the second height, the third height, and the fourth height are different heights. In some embodiments, the first height and the third height are substantially the same height (e.g., within the accuracy of the ability to control the respective vehicle, as described below). In some embodiments, the second height and the fourth height are substantially the same height. In some embodiments, height corresponds to a distance above the ground of a camera obtaining the first and/or second pluralities of images.

In some embodiments, the method further comprises determining from the second subset of images, for each fruit of a plurality of fruit growing on a subset of plants, a respective fruit size. In some embodiments, the method further comprises determining from the fourth subset of images, for each fruit of a plurality of fruit growing on a subset of plants, a respective fruit size.

In some embodiments, the method further comprises scaling (e.g., extrapolating from) the predicted yield of fruit from the agricultural plot by the plurality of fruit sizes (e.g., where the predicted yield of fruit is provided in an amount such as weight (e.g., tonnage) or volume (e.g., bushels)). In some embodiments, the method further comprises determining, for each fruit in the plurality of fruit, a respective fruit weight based on the corresponding fruit size, and scaling the predicted yield of fruit by the plurality of fruit weights. In some embodiments, the scaling is non-linear.

In some embodiments, the method further comprises obtaining historical yield information and/or contextual information for the agricultural plot, and scaling the predicted yield of fruit from the agricultural plot using the historical yield or contextual information. In some embodiments, the contextual information for the agricultural plot comprises historical yield information for the agricultural plot or for a similar or surrounding region. In some embodiments, the contextual information for the agricultural plot comprises near infrared (or other narrow band sensor) information obtained for the agricultural plot, temperature information obtained (e.g., via sensors) for the agricultural plot, humidity information obtained for the agricultural plot, or a combination thereof.

In some embodiments, the method further comprises estimating for each plant detected in the first plurality of images, a respective number of fruit and, for each fruit growing in each plant, a corresponding fruit size. In some embodiments, the method further comprises estimating for each plant in the plurality of plants, a respective number of fruit and, for each fruit growing in each plant a corresponding fruit size.

In some embodiments, the method further comprises scaling the predicted yield of fruit from the agricultural plot using the respective number of fruit and the corresponding fruit sizes for each plant in the plurality of plants. In some embodiments, the scaling is non-linear.

In some embodiments, the method further comprises using a first vehicle to obtain the first plurality of images and a second vehicle to obtain the second plurality of images. In some embodiments, the method further comprises obtaining a first route record for the first vehicle corresponding to the first plurality of images, and a second route record for the second vehicle corresponding to the second plurality of images. In some embodiments, the first vehicle is the second vehicle. In some embodiments, the first vehicle and the second vehicle are different vehicles.

In some embodiments, the first and/or second vehicle comprises an aerial vehicle such as a manned or unmanned aerial vehicle (UAV). In some embodiments, the UAV comprises a drone, a satellite, or another aircraft.

In some embodiments, the first route record comprises i) a first route over the agricultural plot and ii) a respective velocity of the first vehicle for each image in the first plurality of images, and the second route record comprises i) a second route over the agricultural plot and ii) a respective velocity of the second vehicle for each image in the second plurality of images. In some embodiments, the first route record further comprises iii) a respective timestamp for each image in the first plurality of images (e.g., where each respective timestamp corresponds to a time an image was obtained). In some embodiments, the second route record further comprises iii) a respective timestamp in the second plurality of images.

In some embodiments, the first route record further comprises a respective height and a respective location for each image in the first subset (and/or first plurality) of images, and each image in the first subset (and/or first plurality) of images is evaluated for satisfaction of one or more validation criteria.

In some embodiments, the second route record further comprises a respective height and a respective location for each image in the second subset (and/or second plurality) of images, and each image in the second subset (and/or second plurality) of images is evaluated for satisfaction of one or more validation criteria.

In some embodiments, the method further comprises estimating, from the first subset of images, a respective plant size of each respective plant of a plurality of plants in the agricultural plot, and estimating, from the second subset of images, for each fruit of a plurality of fruit growing in the canopy of the agricultural plot, a respective fruit size. In some embodiments, the plurality of fruit comprises fruit growing on plants in a respective portion of the agricultural plot.

In some embodiments, the method further comprises displaying a histogram of fruit size using the fruit sizes for the plurality of fruit and the plant sizes for the plurality of plants. In some embodiments, the method further comprises displaying a histogram of fruit color (e.g., binning fruits by color shade, which can be indicative of ripeness). In some embodiments, the method further comprises displaying a histogram of fruit maturity stages (e.g., as determined by fruit size, fruit color, or a combination thereof).

In some embodiments, the first and/or second vehicle (e.g., the first and/or second UAV) includes an RGB camera. In some embodiments, each image in the first and second subsets of images comprises a corresponding RGB image. In some embodiments, each image in the plurality of images comprises an RGB image.

In some embodiments, the fruit are of a fruit type selected from the group consisting of blueberries, cherries, plums, peaches, nectarines, apricots, olives, mangos, pears, apples, quinces, loquats, citrus, figs, papayas, avocados, coconuts, durians, guavas, persimmons, pomegranates, nuts, or the like. In other embodiments, the inventions can be used to identify and estimate any object that can be identified from above, including people, animals, structures, vehicles, or the like.

In some embodiments, the method is repeated at one or more time points over a season (e.g., a respective growing season for a respective fruit type) to obtain updates of the predicted yield of fruit.

In some embodiments, the method further comprises providing a confidence value for the predicted yield of fruit from the agricultural plot.

In some embodiments, the second subset of images of the canopy of the agricultural plot includes two or more images obtained at different positions in the agricultural plot, where the two or more images include a respective fruit growing in the agricultural plot.

In some embodiments, the method further comprises, for each respective fruit of the plurality of fruit, using a first trained computational model (e.g., a machine learning model) applied to the two or more images that include a respective fruit, identifying a corresponding contour of the respective fruit in the respective two or more images, thereby obtaining respective contours of the same fruit in the two or more images, and calculating a size of the respective fruit from the respective contours of the respective fruit in the two or more images. In some embodiments, calculating the size of the respective fruit further comprises using stereotriangulation as described with regards to FIGS. 8A-8C.

In some embodiments, calculating the respective fruit size for each fruit in the plurality of fruit includes assigning a respective fruit identifier for each fruit in the plurality of fruit. In some embodiments, the calculating further comprises averaging the size of each respective fruit across the plurality of images (e.g., for each set of two or more images).

In some embodiments, a second trained computational model is used to verify that each contour corresponds to a fruit, and contours that do not correspond to a fruit (e.g., contours that delineate leaves or other portions of the canopy of the agricultural plot that are not identifiable as fruit) are discarded.

In some embodiments, the method further comprises determining from the plurality of images, for each fruit of the plurality of fruit, a respective fruit color. In some embodiments, determining fruit color comprises i) identifying from the plurality of images, for each fruit of the plurality of fruit, a corresponding contour, ii) extracting, from each respective contour one or more color feature descriptors, and iii) determining a respective color for each fruit of the plurality of fruit. In some embodiments, the method further comprises assigning a respective maturity stage to each fruit of the plurality of fruit based at least in part on the respective fruit color.

IV. A Computational Model for Identifying Fruit from Images.

Another aspect of the present disclosure provides a method of training a computational model to identify fruit in agricultural plot images. The method proceeds by obtaining, in electronic format, a training dataset, wherein the training dataset comprises a plurality of training images from a plurality of agricultural plots, wherein each training image is from a respective agricultural plot in the plurality of agricultural plots and comprises at least one identified fruit. The method further includes determining, for each respective fruit in each respective training image in the plurality of training images, a corresponding contour, and a corresponding fruit size. The method further comprises training an untrained or partially trained computational model using at least the corresponding contour and corresponding fruit size for each respective fruit in each respective training image in the plurality of training images, thereby obtaining a first trained computational model that is configured to identify fruit in agricultural plot images.

Other embodiments are directed to systems, portable consumer devices, and computer readable media associated with the methods described herein. As disclosed herein, any embodiment disclosed herein can be applied in some embodiments to any other aspect. Additional aspects and advantages of the present disclosure will become readily apparent to those skilled in this art from the following detailed description, where only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the several views of the drawings.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

The implementations described herein provide various technical solutions for predicting the yield of an agricultural plot.

Several aspects are described below with reference to example applications for illustration. It should be understood that numerous specific details, relationships, and methods are set forth to provide a full understanding of the features described herein. One having ordinary skill in the relevant art, however, will readily recognize that the features described herein can be practiced without one or more of the specific details or with other methods. The features described herein are not limited by the illustrated ordering of acts or events, as some acts can occur in different orders and/or concurrently with other acts or events. Furthermore, not all illustrated acts or events are required to implement a methodology in accordance with the features described herein.

Note that, while the remainder of this document refers often to fruit size and yield, one of skill in the art having the benefit of this disclosure will understand that many of the systems and methods described herein are applicable to any crop, including non-fruit crops (lettuce, turnips, broccoli, etc.) Further, the term "fruit" should be construed to include the fruiting body of any plant. For example, walnuts, peppers, beans, and the like, are all fruit, as are oranges, apples, etc.

Further, although some embodiments of the present disclosure refer to images obtained aerially (e.g., from a unmanned aerial vehicle or a satellite), in some embodiments, ground-based imagery can be used to supplement or replace the aerial imagery. One of skill in the art having the benefit of this disclosure will understand to which embodiments ground-based imagery may be applicable.

Figure 1:
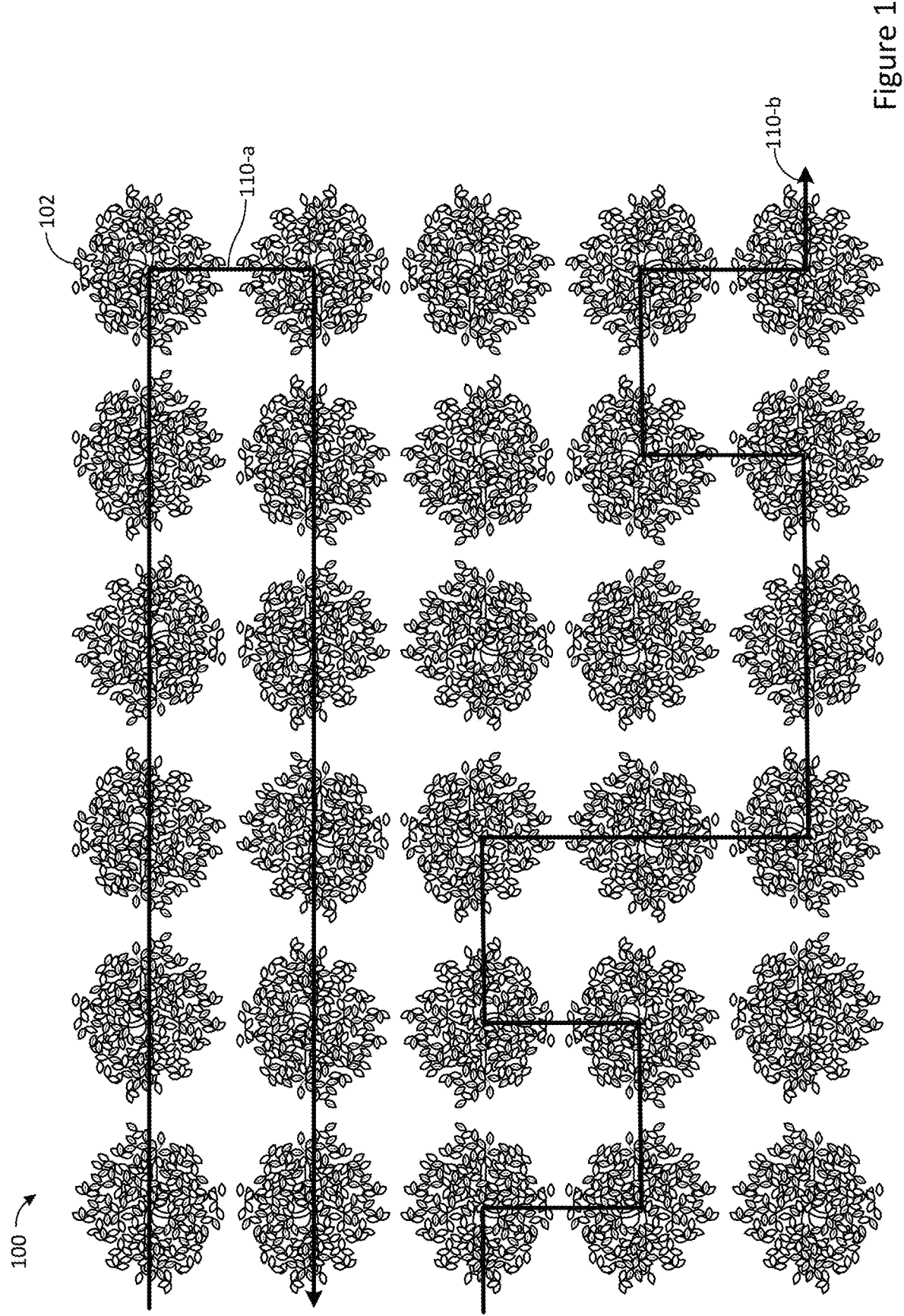
FIG. 1 illustrates example image collection routes in an agricultural plot, in accordance with some embodiments of the present disclosure.

FIG. 1 illustrates example image collection routes 110 (e.g., route 110-a and route 110-b) in an agricultural plot 100, in accordance with some embodiments of the present disclosure. In some embodiments, the image collection routes 110 are traversed by a drone 202 or other vehicle situated (e.g., flying) at a first height (e.g., 3-10 m) above the orchard to obtain images at a first resolution (e.g., which are measured in pixels per millimeter) during a scouting mission (also referred to as a drone scouting mission or a drone mission). The images collected during image collection routes 110 are used to estimate fruit yield for the agricultural plot, as described throughout the present disclosure.

In some embodiments, the agricultural plot comprises a plurality of trees 102 arranged in rows (e.g., the agricultural plot is an orchard). Route 110-a is an example in which drone 202 or another UAV flies over an entire row in the orchard, switches to the next row, and flies over that entire row. However, route 110-b illustrates other embodiments or circumstances in which the route takes the UAV between rows (e.g., without reaching the end of the row). Thus, unlike terrestrial-based vehicles (e.g., tractors), UAVs are able to scout a subset (e.g., less than all) of the trees in a plurality of different rows. Using the systems and methods described herein, accurate fruit yield estimates can be determined using more efficient (e.g., shorter) routes, as compared to conventional methods of estimating fruit yield.

As described in greater detail below, in some embodiments, the drone 202 or other vehicle obtains two or more images from a second height (e.g., a height greater than the first height). Note that, in some embodiments, a first vehicle (e.g., drone 202) obtains the images from the first height and a second vehicle (e.g., satellite 506, FIG. 5) different from the first vehicle obtains the images from the second height. In some embodiments, the second height provides a bird's eye view of the entire agricultural plot, or a birds' eye view of at least a region of the agricultural plot. From the second height, various spatial distributions of characteristics (e.g., growing conditions, tree heath) affecting fruit yield (e.g., slope, aspect, moisture level) are observed and determined. The spatial distribution of characteristics is used, in some embodiments, to inform the selection of image collection routes 110 and to scale the resulting fruit yield estimates to more accurately reflect the entire agricultural plot. For example, route 110-b is selected to visit a plurality of different regions of the agricultural plot with a plurality of different characteristics and/or growing conditions, so as to more accurately sample fruit growth without needing to visit every tree in the orchard.

Figure 2B:
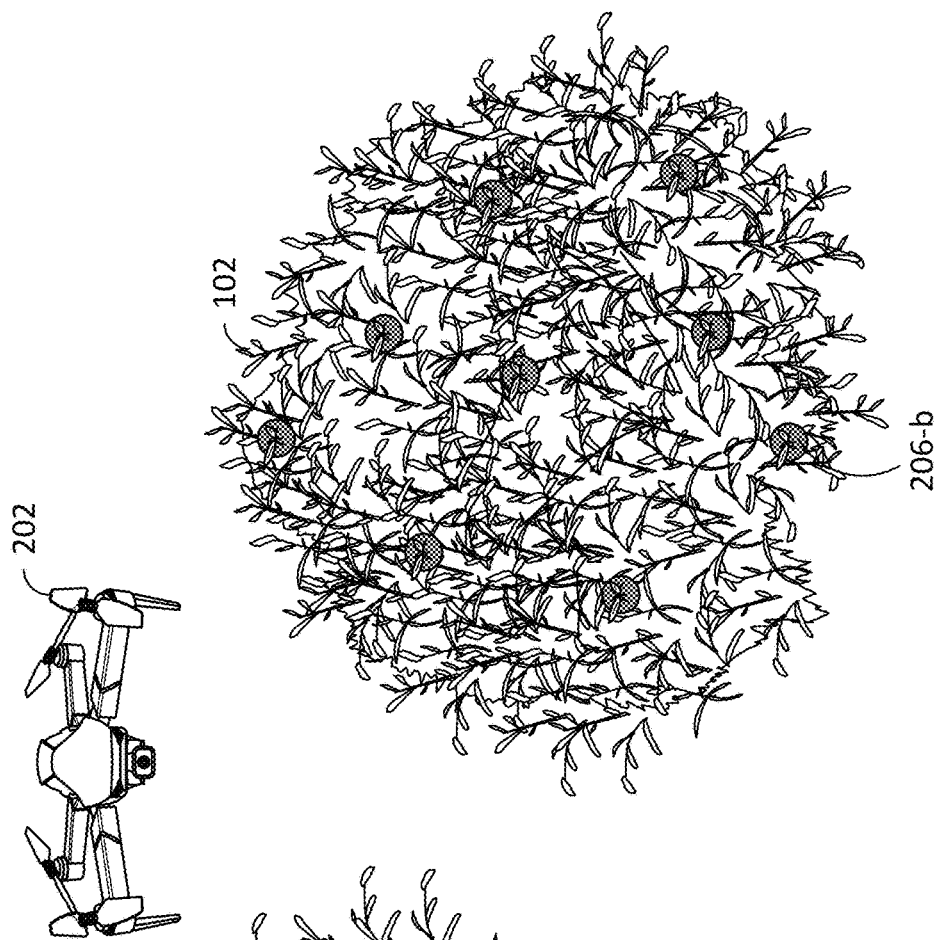
FIGS. 2A and 2B collectively illustrate examples of different tree canopy views, in accordance with some embodiments of the present disclosure.
Figure 2A:
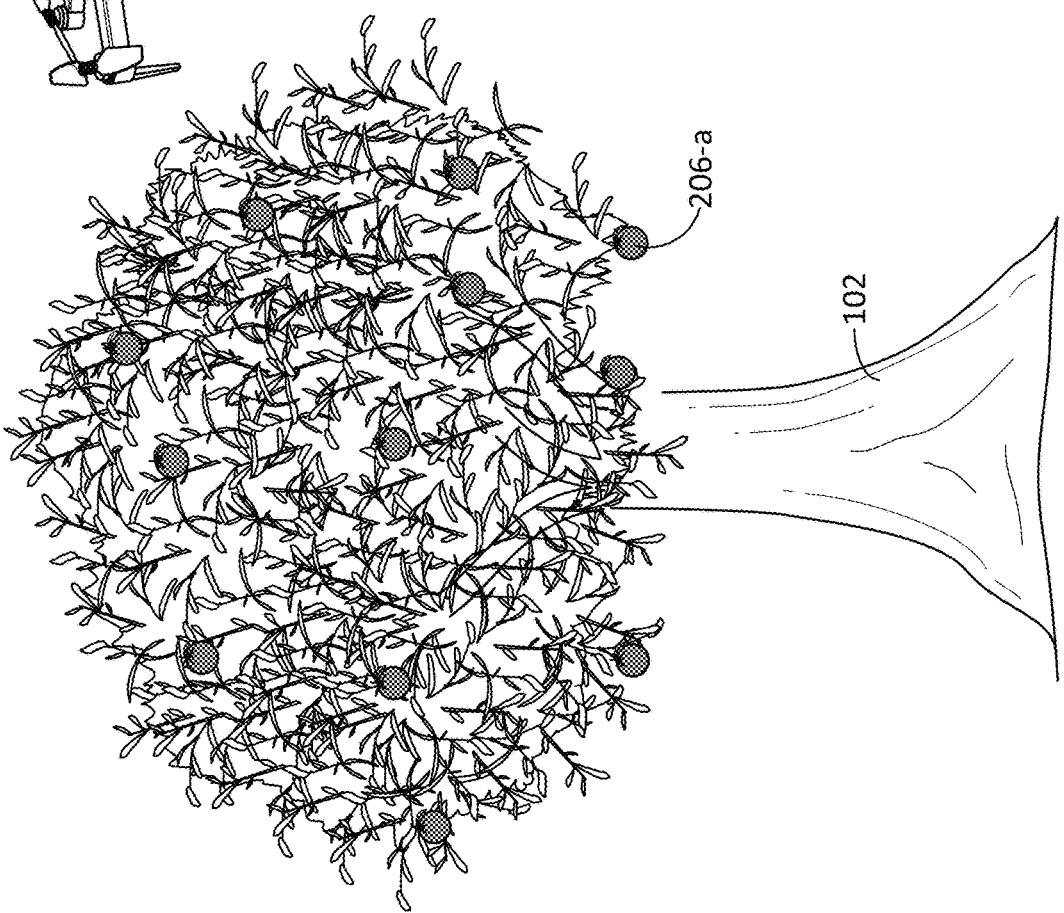

FIGS. 2A and 2B collectively illustrate examples of different tree canopy views, in accordance with some embodiments of the present disclosure. FIG. 2A illustrates that, in some embodiments, images obtained from above the agricultural plot are obtained at or below the top of the trees 102 (e.g., the images are obtained from a top-side view of the trees 102). FIG. 2B, on the other hand, illustrates that, in some embodiments, images obtained from above the agricultural plot are obtained above the top of the trees 102 (e.g., the images are of a top of the canopy of the trees 102). The images include fruit 206 (e.g., fruit 206-a in FIG. 2A and fruit 206-b in FIG. 2B).

As described in greater detail throughout this disclosure, in some embodiments, individual fruit 206 are identified and tracked throughout different images (e.g., assigned a unique fruit identified). For example, the same fruit 206-a is identified in two different images obtained by the same respective vehicle (e.g., identified in images acquired by the same camera on the same vehicle) when the respective vehicle is at two different positions in the orchard (e.g., the fruit is matched between images). In some embodiments, using two images that include the same fruit, as well as knowledge of the locations at which the two images were taken, a size of the fruit is determined based on a disparity of the size of the fruit in the two images (e.g., the disparity in the imaged size of the fruit is used to estimate the size of the fruit through triangulation, as described with reference to FIG. 8). In some embodiments, the two images that include the same fruit were collected at the same height (e.g., the two images are from either the first height or the second height). In some embodiments, the estimate of the size of individual fruit is performed in this manner for a plurality of fruit 206 in the orchard, and the respective fruit sizes are used to estimate the overall yield for the orchard.

Note that, regardless of where the images are taken from (e.g., the top side view or the top canopy view), only a fraction (less than all) of the fruit will be visible to the camera, and thus detectable. Thus, some embodiments scale fruit yield estimations based on a scaling factor to determine an estimate of fruit yield that includes fruit not visible (not detectable) in the images obtained by the drone 202. In some embodiments, scaling of (e.g., extrapolating) fruit yield estimations is non-linear (e.g., more than one scaling factor or a scaling factor equation is used).

Figure 3B:
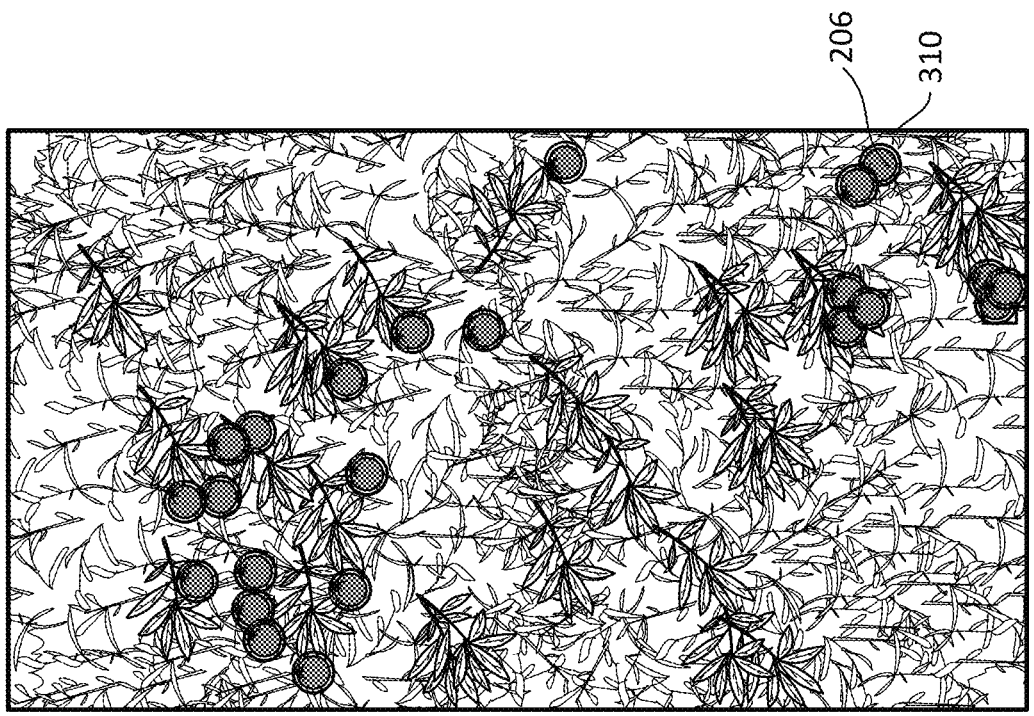
FIGS. 3A and 3B illustrate examples of fruit identification (e.g., through bounding boxes or contours) in images, in accordance with some embodiments of the present disclosure.
Figure 3A:
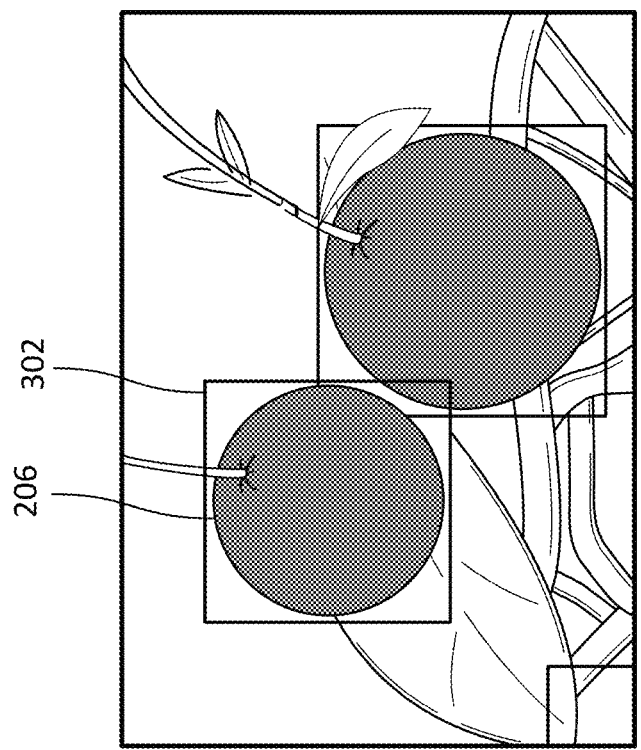

FIGS. 3A and 3B illustrate examples of fruit identification (e.g., through bounding boxes or contours) in images, in accordance with some embodiments of the present disclosure. FIG. 3A illustrates an example in which bounding boxes 302 are identified for each fruit 206. FIG. 3B illustrates an example in which curved contours 310 are identified (representing the margins of each fruit 206). The curved contours 310 provide information about the shape of each fruit, which, in some embodiments, is provided to the user (e.g., through a graphical user interface). In either case, with appropriate scaling, disparities in the contour for an identified fruit between two or more images, together with knowledge of where the two or more images where taken (e.g., from a route record) can be used to determine a size of the identified fruit.

Figure 4:
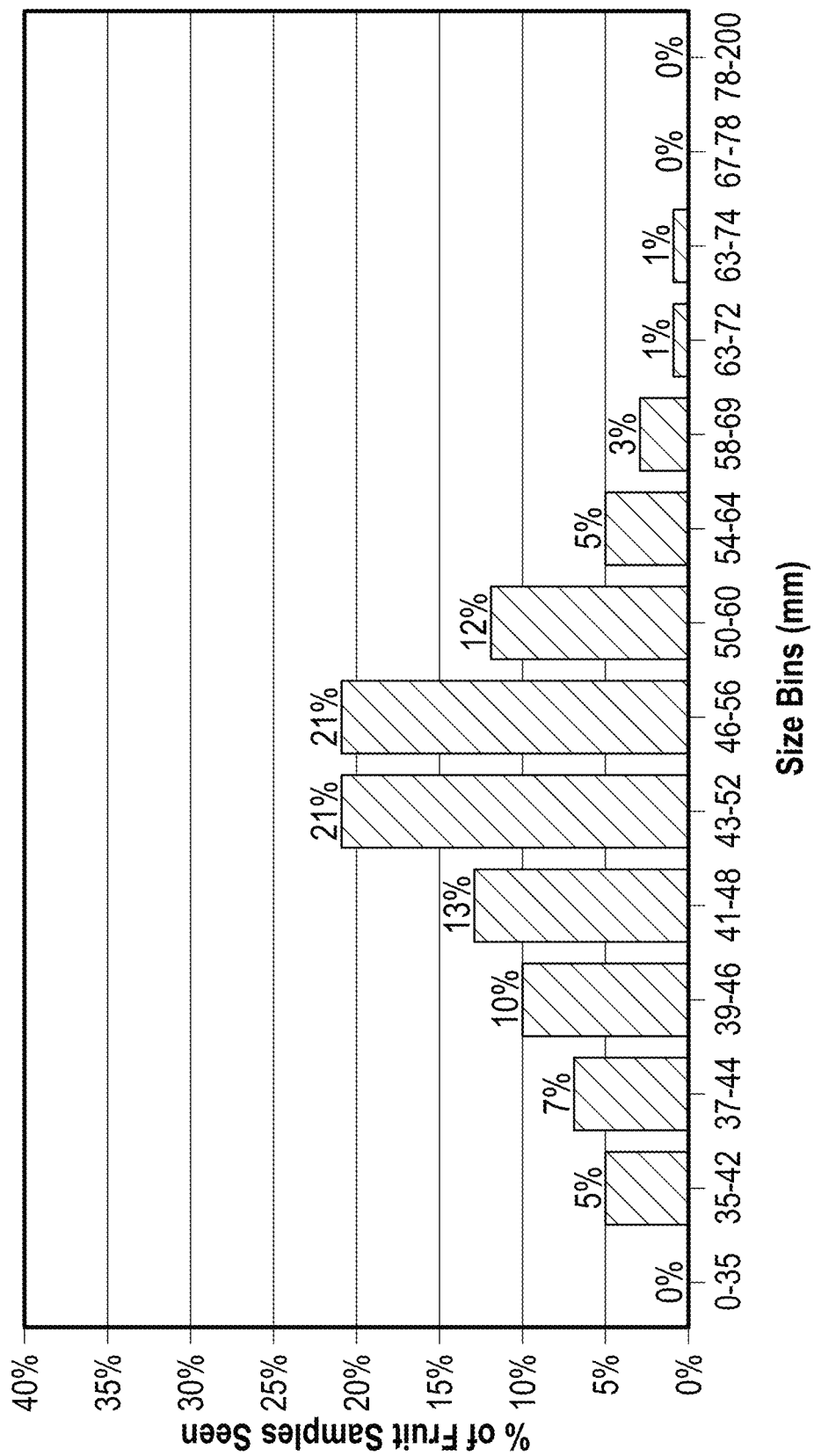
FIG. 4 illustrates an example histogram of fruit sizes that is provided in accordance with some embodiments of the present disclosure.

FIG. 4 illustrates an example histogram of fruit sizes that is provided in accordance with some embodiments of the present disclosure. The histogram of fruit sizes provides a count or percentage of fruit for each respective fruit size bin. In some embodiments, the histogram of fruit sizes provides a projected (estimated) distribution of fruit sizes for a later time (e.g., at the time of harvest) based at least in part on one or more sets of current or past observations (e.g., where the sets of observations include the images described throughout this disclosure). In some embodiments, the method further comprises providing a histogram of fruit color. In some embodiments, the histogram of fruit colors provides a count or percentage of fruit for each respective fruit color bin. In some embodiments, the histogram of fruit colors provides a projected distribution of fruit colors for a later time (e.g., for the time of harvest) based at least in part on one or more sets of current or past observations. In some embodiments, the method further comprises providing a histogram of fruit maturity. In some embodiments, the histogram of fruit maturity provides a count or percentage of fruit for each respective maturity stage (e.g., ripe vs unripe). In some embodiments, the histogram of fruit maturity provides a projected distribution of fruit maturity stages for a later time (e.g., for the time of harvest) based at least in part on one or more sets of current or past observations. In some embodiments, binning for the histogram of fruit color and/or the histogram of fruit maturity is based at least in part on the respective fruit type being considered.

Figure 5:
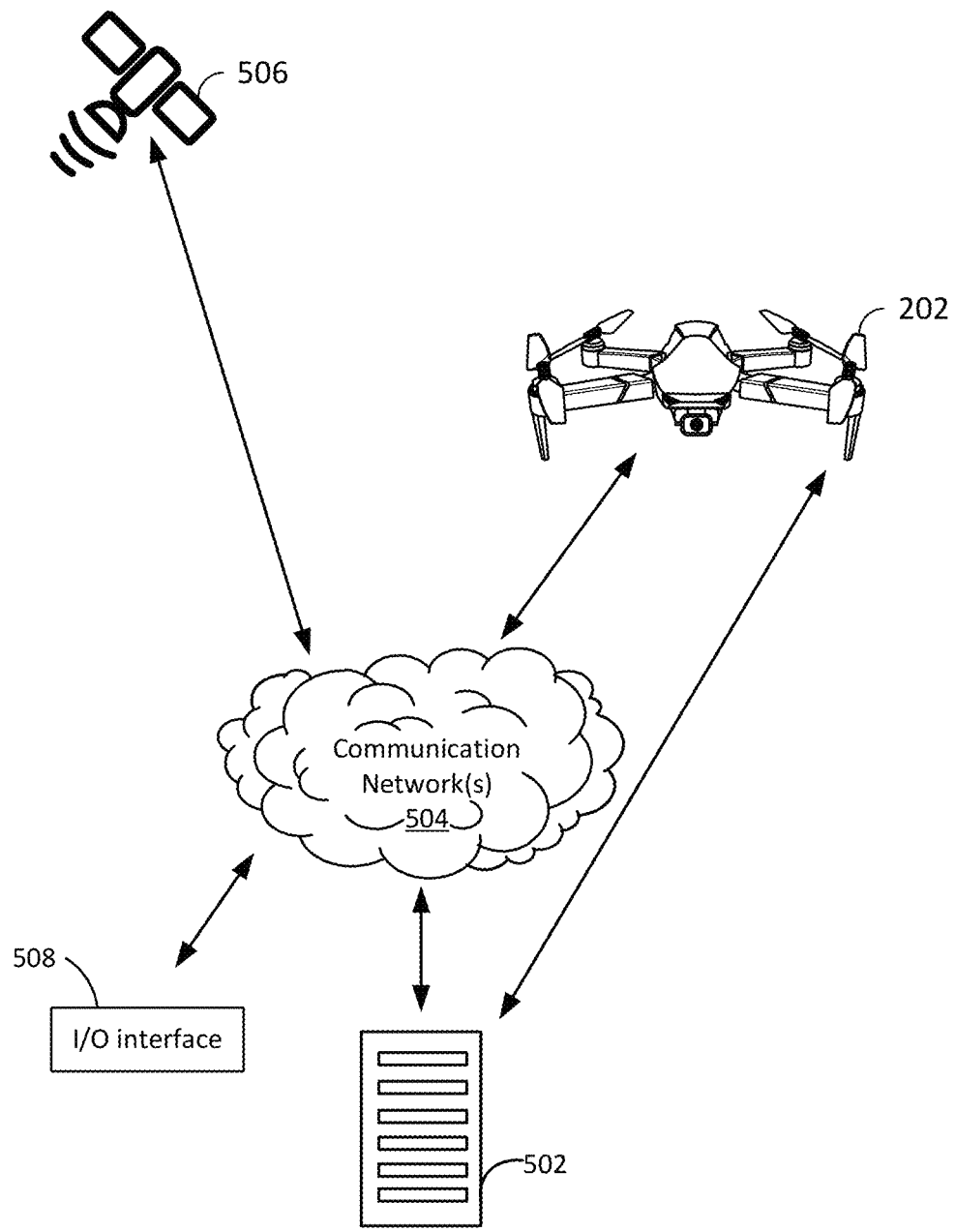
FIG. 5 illustrates example communications connections of various devices, in accordance with some embodiments of the present disclosure.

FIG. 5 illustrates example communications connections of various devices, in accordance with some embodiments of the present disclosure. For example, in some embodiments, drone 202, server 502, satellite 506, and user interface 508 (e.g., a device with a human-operable user interface, such as a desktop computer, laptop computer, tablet, mobile phone, or the like) communicate through one or more communications networks 504. In some embodiments, the one or more networks 504 include public communication networks, private communication networks, or a combination of both public and private communication networks. For example, the one or more networks 504 can be any network (or combination of networks) such as the Internet, other wide area networks (WAN), local area networks (LAN), virtual private networks (VPN), metropolitan area networks (MAN), peer-to-peer networks, and/or ad-hoc connections. In some embodiments, drone 202 and/or server 502 communicate with satellite 506 using TCP/IP.

Figure 6:
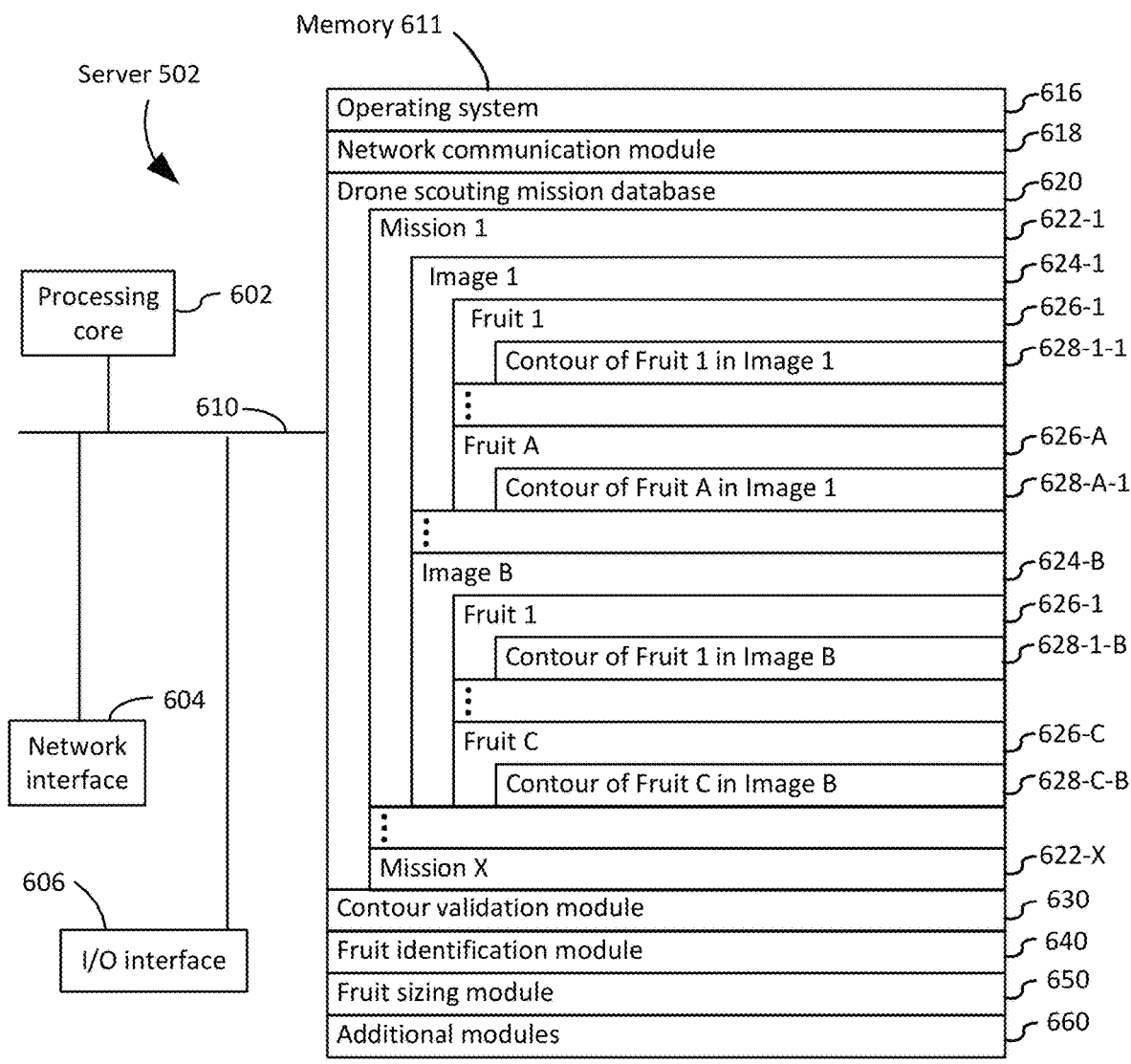
FIG. 6 illustrates a block diagram of a system (e.g., an exemplary server) in accordance with some embodiments of the present disclosure.
Figure 7:
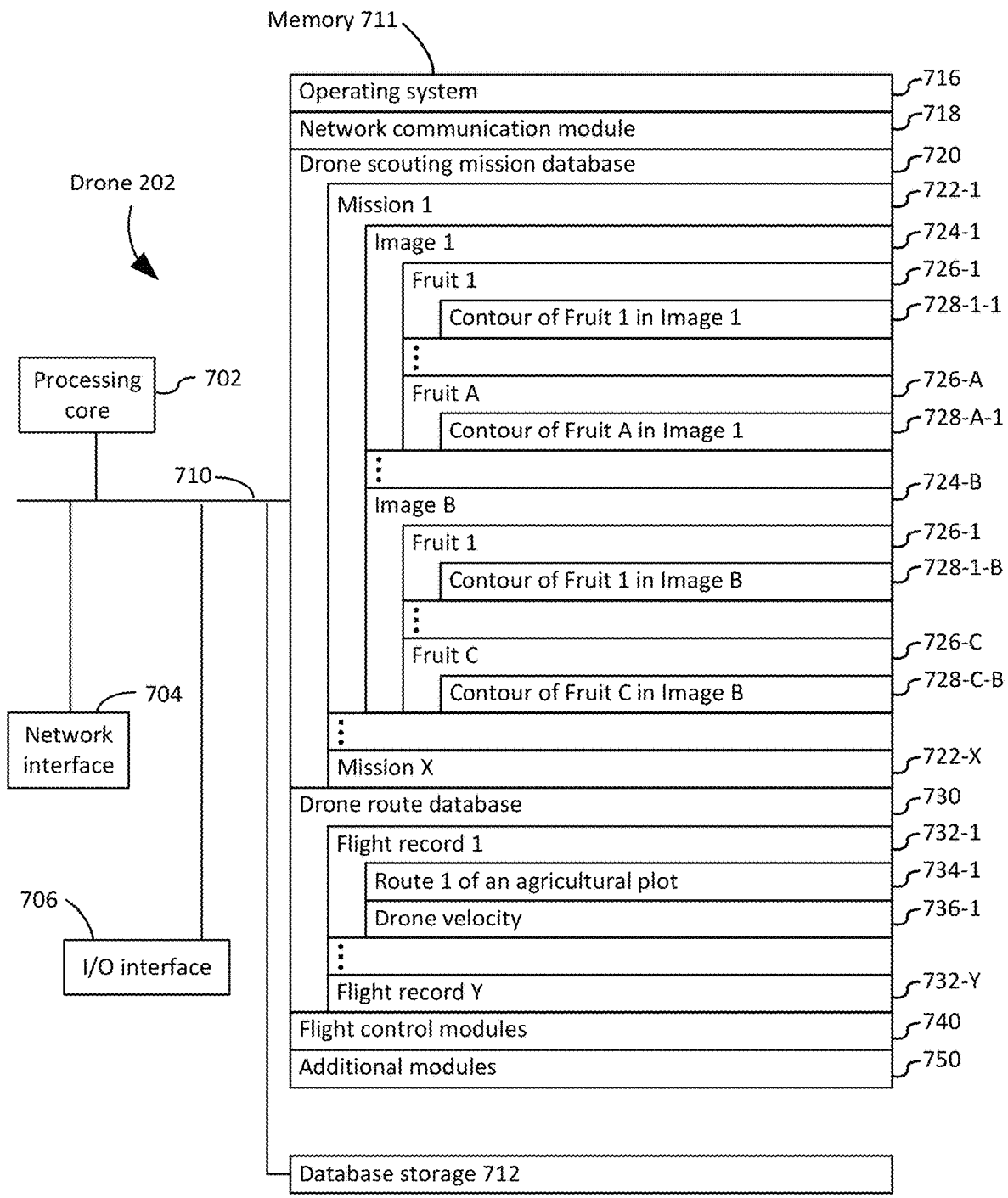
FIG. 7 illustrates a block diagram of a system (e.g., an exemplary vehicle or other image collection device) in accordance with some embodiments of the present disclosure.

Details of exemplary systems are now described in conjunction with FIGS. 6 and 7. FIG. 6 illustrates an exemplary server 502 as shown in FIG. 5. In some embodiments, server 502 includes one or more processing units CPU(s) 602 (also referred to as processors), one or more network interfaces 604, memory 611 for storing programs and instructions for execution by the one or more processors 602, one or more communications interfaces such as input/output interface 606, and one or more communications buses 610 for interconnecting these components.

The one or more communication buses 610 optionally include circuitry (sometimes called a chipset) that interconnects and controls communications between system components. The memory 611 typically includes high-speed random access memory, such as DRAM, SRAM, DDR RAM, ROM, EEPROM, flash memory, CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. Memory 611 optionally includes one or more storage devices remotely located from the CPU(s) 602. Memory 611, and the non-volatile memory device(s) within the memory 611, comprise a non-transitory computer readable storage medium.

In some embodiments, memory 611 or alternatively the non-transitory computer readable storage medium stores the following programs, modules and data structures, or a subset thereof:

Operating system 616, which includes procedures for handling various basic system services and for performing hardware dependent tasks;

Network communication module (or instructions) 618 for connecting server 502 with other devices, or a communication network;

Drone scouting mission database 620, which includes:
A plurality of drone missions 622, each comprising, for each image 624 in a plurality of images, a respective contour 628 for one or more fruit 626;

Contour validation module 630 that includes instructions for validating identified fruit contours 628, where fruit contours that do not meet validation criteria are removed;

Fruit identification module 640 that includes instructions for detecting fruit 626 from images 624;

Fruit sizing module 650 that includes instructions for determining respective fruit size, for identified and validated fruit contours 628; and Optionally, other modules 660 that include instructions for handling other functions and aspects described herein.

In some embodiments, optional modules 660 include a color detection module that includes instruction for determining respective fruit color, for identified and validated fruit contours 628. In some embodiments, the plurality of drone missions 622 further comprise, for each image 624 a respective color for one or more fruit.

In various implementations, one or more of the above identified elements are stored in one or more of the previously mentioned memory devices, and correspond to a set of instructions for performing a function described above. The above identified modules, data, or programs (e.g., sets of instructions) need not be implemented as separate software programs, procedures, datasets, or modules, and thus various subsets of these modules and data may be combined or otherwise re-arranged in various implementations. In some implementations, memory 611 optionally stores a subset of the modules and data structures identified above. Furthermore, in some embodiments, the memory stores additional modules and data structures not described above. In some embodiments, one or more of the above identified elements is stored in a computer system, other than that of server 502, that is addressable by server 502 so that server 502 may retrieve all or a portion of such data when needed.

Although FIG. 6 depicts server 502, the figure is intended more as a functional description of the various features that may be present in computer systems than as a structural schematic of the implementations described herein. In practice, and as recognized by those of ordinary skill in the art, items shown separately could be combined and some items could be separated.

FIG. 7 illustrates an exemplary drone 202 as shown in FIG. 5. In some embodiments, drone 202 includes one or more processing units CPU(s) 702 (also referred to as processors), one or more network interfaces 704, memory 711 for storing programs and instructions for execution by the one or more processors 702, one or more communications interfaces such as input/output interface 706, and one or more communications buses 710 for interconnecting these components.

The one or more communication buses 710 optionally include circuitry (sometimes called a chipset) that interconnects and controls communications between system components. The memory 711 typically includes high-speed random access memory, such as DRAM, SRAM, DDR RAM, ROM, EEPROM, or flash memory, CD-ROM, digital versatile disks (DVD) or other optical storage, magnetic cassettes, magnetic tape, magnetic disk storage or other magnetic storage devices, magnetic disk storage devices, optical disk storage devices, flash memory devices, or other non-volatile solid state storage devices. The database 712 optionally includes one or more storage devices remotely located from the CPU(s) 702. The database 712, and the non-volatile memory device(s) within the database 712, comprise a non-transitory computer readable storage medium. In some implementations, memory 711 and/or the non-volatile memory device(s) within memory 711 comprises a non-transitory computer readable storage medium.

In some embodiments, memory 711 and/or the non-transitory computer readable storage medium comprising memory 711 stores the following programs, modules and data structures, or a subset thereof, sometimes in conjunction with the database 712:

Operating system 716, which includes procedures for handling various basic system services and for performing hardware dependent tasks;

Network communication module (or instructions) 718 for connecting drone 202 with other devices, or a communication network;

Drone scouting mission database 720, which includes:
        A plurality of drone missions 722, each comprising, for each image 724 in a plurality of images, a respective contour 728 for one or more fruit 726;

Drone route database 730, which includes:
        A plurality of route records 732, each comprising a respective route 734 through an agricultural plot and a respective drone velocity 736;

One or more flight control modules 740 that includes instructions for piloting; and Optionally, other modules 750 that include instructions for handling other functions and aspects described herein.

In various implementations, one or more of the above identified elements are stored in one or more of the previously mentioned memory devices, and correspond to a set of instructions for performing a function described above. The above identified modules, data, or programs (e.g., sets of instructions) need not be implemented as separate software programs, procedures, datasets, or modules, and thus various subsets of these modules and data may be combined or otherwise re-arranged in various implementations. In some implementations, the memory 711 optionally stores a subset of the modules and data structures identified above. Furthermore, in some embodiments, the memory stores additional modules and data structures not described above. In some embodiments, one or more of the above identified elements is stored in a computer system, other than that of drone 202, that is addressable by drone 202 so that drone 202 may retrieve all or a portion of such data when needed.

Although FIG. 7 depicts drone 202, the figure is intended more as a functional description of the various features that may be present in computer systems than as a structural schematic of the implementations described herein. In practice, and as recognized by those of ordinary skill in the art, items shown separately could be combined and some items could be separated.

In some embodiments, the one or more flight modules 750 control positioning of a respective vehicle (e.g., either a manned or unmanned aircraft) within a predefined distance threshold (e.g., the location of drone 202 at every time is controlled within a predefined distance threshold). In some embodiments, the predefined distance threshold is less than 1 foot, less than 2 feet, less than 3 feet, less than 4 feet, less than 5 feet, less than 6 feet, less than 7 feet, less than 8 feet, less than 9 feet, less than 10 feet, less than 20 feet, less than 30 feet, less than 40 feet, or less than 50 feet. In some embodiments, a different predefined distance threshold is used for each respective vehicle (e.g., there is a distinct predefined distance threshold for a drone vs. a satellite).

Stereo Triangulation and Determining Fruit Size

In some embodiments, the methods herein provide for identifying fruit size based on analysis of two or more images (e.g., two or more RGB images). In some embodiments, the analysis of the two or more images comprises determining a respective image resolution (e.g., a conversion of size to pixels) for each image in the two or more images. In some embodiments, a respective initial fruit size is determined for a particular fruit in each image in the two or more images. In some such embodiments, a respective size for the particular fruit is determined based on the disparity in initial fruit sizes from the two or more images.

Images used for fruit sizing are selected based on contour analysis. For example, in some embodiments, the two or more images each include a contour corresponding to a same fruit (e.g., a fruit that has been assigned a respective fruit identifier). In some embodiments, the two or more images each include a contour corresponding to a same tree. In some embodiments, the two or more images are adjacent images (e.g., adjacent in time). In some embodiments, the two or more images are from different time points. In some embodiments, the two or more images are from different pluralities or subsets of images (e.g., one image is from the first subset of images and the second image is from the second subset of images). For example, two images taken from different heights in the agricultural plot may include a same fruit (e.g., contours identified as belonging to an individual fruit).

In some embodiments, the two or more images are matched based on contour analysis (e.g., based on determining that each image in the two or more images includes a respective contour corresponding to a same fruit). In some embodiments, the two or more images are not matched or analyzed by using a composite image (e.g., there is no matching of pixels between the two or more images in order to determine fruit size).

Figure 8A:
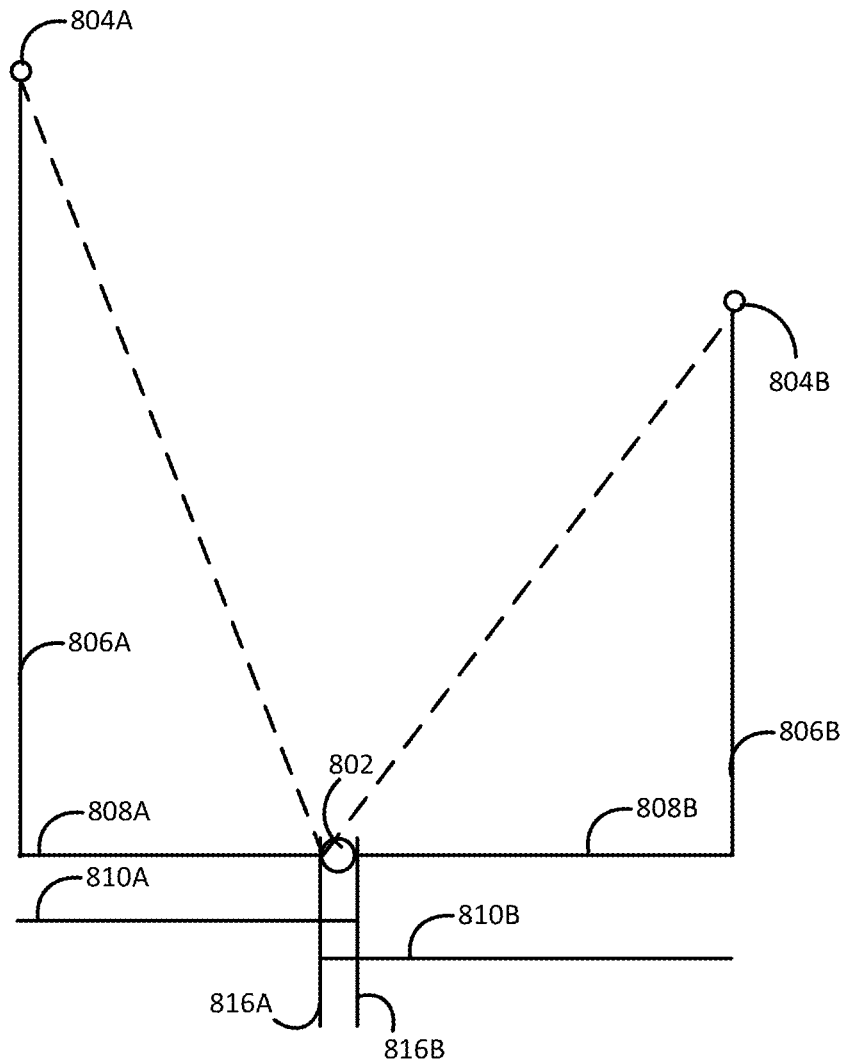
FIGS. 8A, 8B, and 8C collectively illustrate an example of object size determination based on multiple viewing angles, performed in accordance with some embodiments of the present disclosure.
Figure 8B:
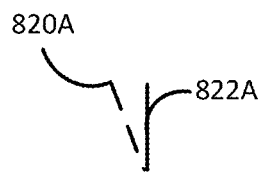
Figure 8C:

FIGS. 8A, 8B, and 8C collectively illustrate an example of how stereo triangulation can be used to determine the size of a respective fruit (e.g., by using at least two images). As shown in FIG. 8A, in some embodiments, there are at least two camera locations 804A and 804B. Each camera location corresponds to the location (e.g., as determined by GPS, IMU, Kalman filtering, etc., or a combination thereof) of at least one image (e.g., in a respective vehicle route through an agricultural plot), where each image comprises a respective object (e.g., a fruit). In some embodiments, these two locations are two separate vehicle locations (e.g., separate camera locations as determined either by the same vehicle or by two different vehicles). In some embodiments, a same camera obtains the at least two images from the two camera locations 8014. In some embodiments, different cameras are used to obtain one or more of the images. In some embodiments, these two locations are merely two separate cameras (e.g., on the same UAV or other vehicle).

In some embodiments, each location has its own respective coordinate reference system, centered on the lens that obtained the image (e.g., represented as 804A and 804B, respectively, in FIG. 8A).

With regards to FIGS. 8A, 8B, and 8C and the equations for triangulating an object (e.g., a fruit) from two or more images in the plurality of images, the following variables are defined. In some embodiments, FIGS. 8B and 8C illustrate the focal lengths 822A and 822B of the camera(s) at locations 804A and 804B, respectively.

In some embodiments, $\Delta x$ corresponds to the estimated distance traveled by the camera (e.g., either the distance traveled by a first camera on a first vehicle, or the distance between a first camera on a first vehicle and a second camera on a second vehicle) between images. In some embodiments, $\Delta x$ requires knowing the respective velocity of the respective vehicle, and $\Delta x$ is estimated by integrating the velocity over the time period between the two images (the time between when each image was obtained). In some embodiments, $\Delta x$ is determined as the distance between the two camera locations 804A and 804B (e.g., either the summation of 810A and 808B or the summation of 808A and 810B).

In some embodiments, $X_1^L$ corresponds to the physical distance 808A of the left edge 816A of object 802 from camera location 804A. Similarly, $X_1^R$ corresponds to the physical distance 808B from the left edge 816A of object 802 from camera location 804B.

In some embodiments, $X_2^L$ corresponds to the physical distance 810A of the right edge 816B of object 802 from camera location 804A. Similarly, $X_2^R$ corresponds to the physical distance 808B from the right edge 816B of object 802 from camera location 804B.

In some embodiments, $d_1$ and $d_2$ respectively correspond to the vertical distances (806A and 806B) of the left and right camera locations (804A and 804B) from a plane on which the object edge is located.

In some embodiments, f corresponds to the focal length (822A and 822B) of the camera(s), which is determined from the specification(s) of the camera(s) used for obtaining the images. In some embodiments, a same camera with a same focal point is used to obtain the at least two images. In some embodiments, a different respective camera (with either a same or different focal point) is used to obtain each of the images in the at least two images.

In some embodiments, $x^L$ corresponds to the pixel coordinates of the object in the left camera image (e.g., 820A), and $x^R$ corresponds to the pixel coordinates of object 802 in the right camera image (820B). In some embodiments, $x^L$ and $x^R$ are each scaled by the camera sensor size, as reported by the camera specifications. In some embodiments, the left and right cameras (e.g., at positions 804A and 804B) define their own coordinate reference systems.

In some embodiments, when the camera is at full resolution, the camera sensor size refers to the physical size of the light sensor attributed to each individual pixel. In some embodiments, when the camera is at variable resolution, the camera sensor size is estimated by dividing the size of the full sensor by the pixel dimensions of the at least two images.

In some embodiments, the width of object 802 can be derived from geometric and algebraic principles. In particular, the rule of similar triangles can be used to obtain the relations:

$$\frac{f}{x_1^L} = \frac{d_1}{X_1^L}, \frac{f}{x_1^R} = -\frac{d_2}{X_1^R} \tag{1}$$

In some embodiments, $$\Delta d = d_1 - d_2 = -\frac{fX_1^L}{x_1^L} + \frac{fX_1^R}{x_1^R} = f(-\frac{X_1^L}{x_1^L} + \frac{X_1^R}{x_1^R}) \tag{2}$$

In some embodiments, equation 2 can be further simplified, using $X_1^R = X_1^L - \Delta x$ as follows:

$$\Delta d = f(-\frac{X_1^L}{x_1^L} + \frac{X_1^L - \Delta x}{x_1^R}) \tag{3}$$

$$\frac{\Delta d}{f} + \frac{\Delta x}{x_1^R} = X_1^L(\frac{1}{x_1^R} - \frac{1}{x_1^L}) \tag{4}$$

-continued
$$X_1^L = (\frac{\Delta d}{f} + \frac{\Delta x}{x_1^R})\frac{x_1^R x_1^L}{x_1^L - x_1^R} \tag{5}$$

In some embodiments, the physical width (e.g., ΔX) of object 802 (e.g., the diameter of a fruit) can then be calculated as:

$$\Delta X = X_2^L - X_1^L = \tag{6}$$
$$X_2^R - X_1^R = \frac{\Delta d}{f}[\frac{x_2^R x_2^L}{x_2^L - x_2^R} - \frac{x_1^R x_1^L}{x_1^L - x_1^R}] + \Delta x[\frac{x_2^L}{x_2^L - x_2^R} - \frac{x_1^L}{x_1^L - x_1^R}]$$

Using equation 6 it is possible, in some embodiments, to determine the size of any object 802, including, but not limited to, fruit and trees. In some embodiments, the physical width of object 802 is determined based at least in part on the resolution of the respective images (e.g., images obtained at the two camera locations 804A and 804B).

Figure 9:
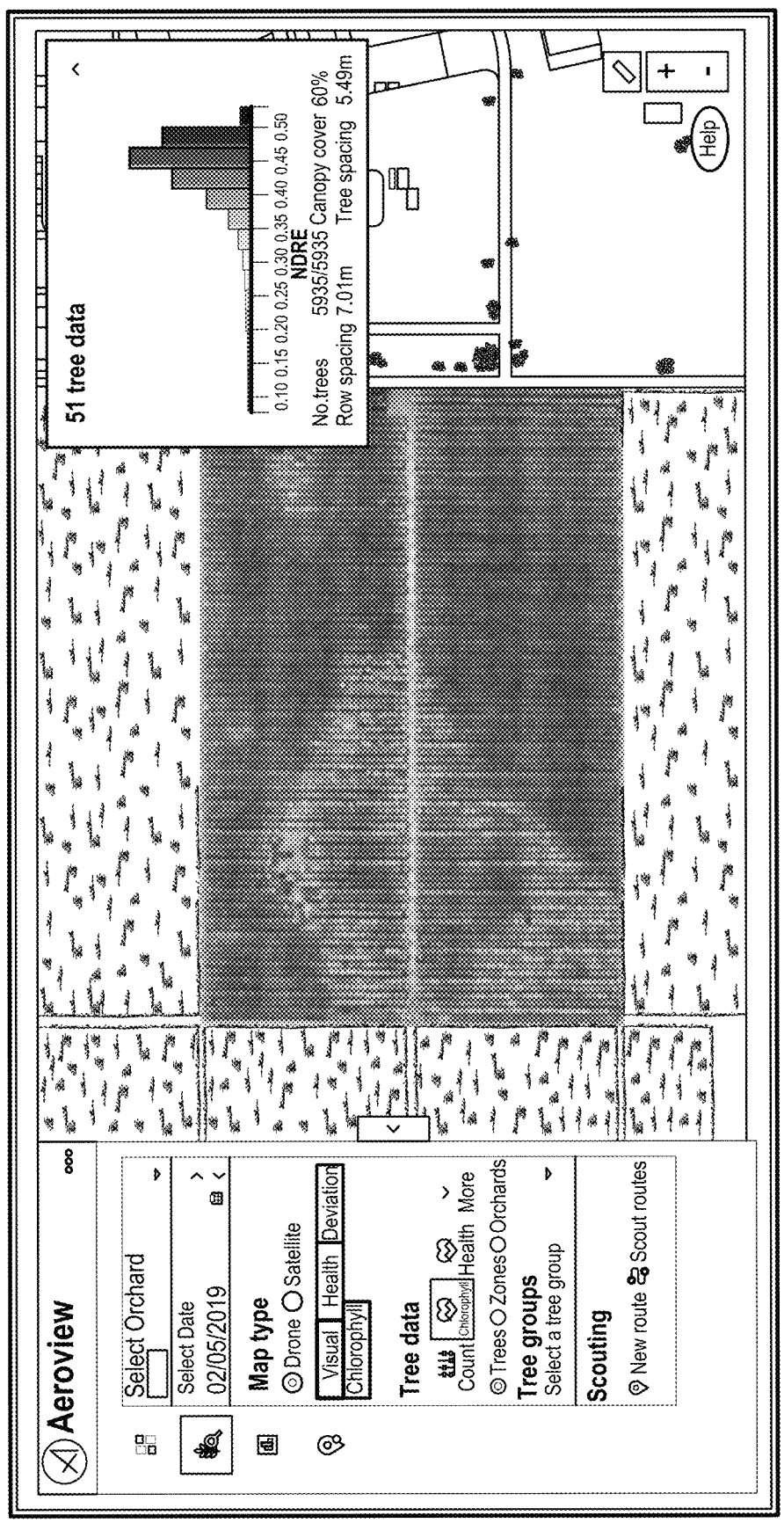
FIG. 9 illustrates an example user interface in accordance with some embodiments of the present disclosure.
Figure 10:
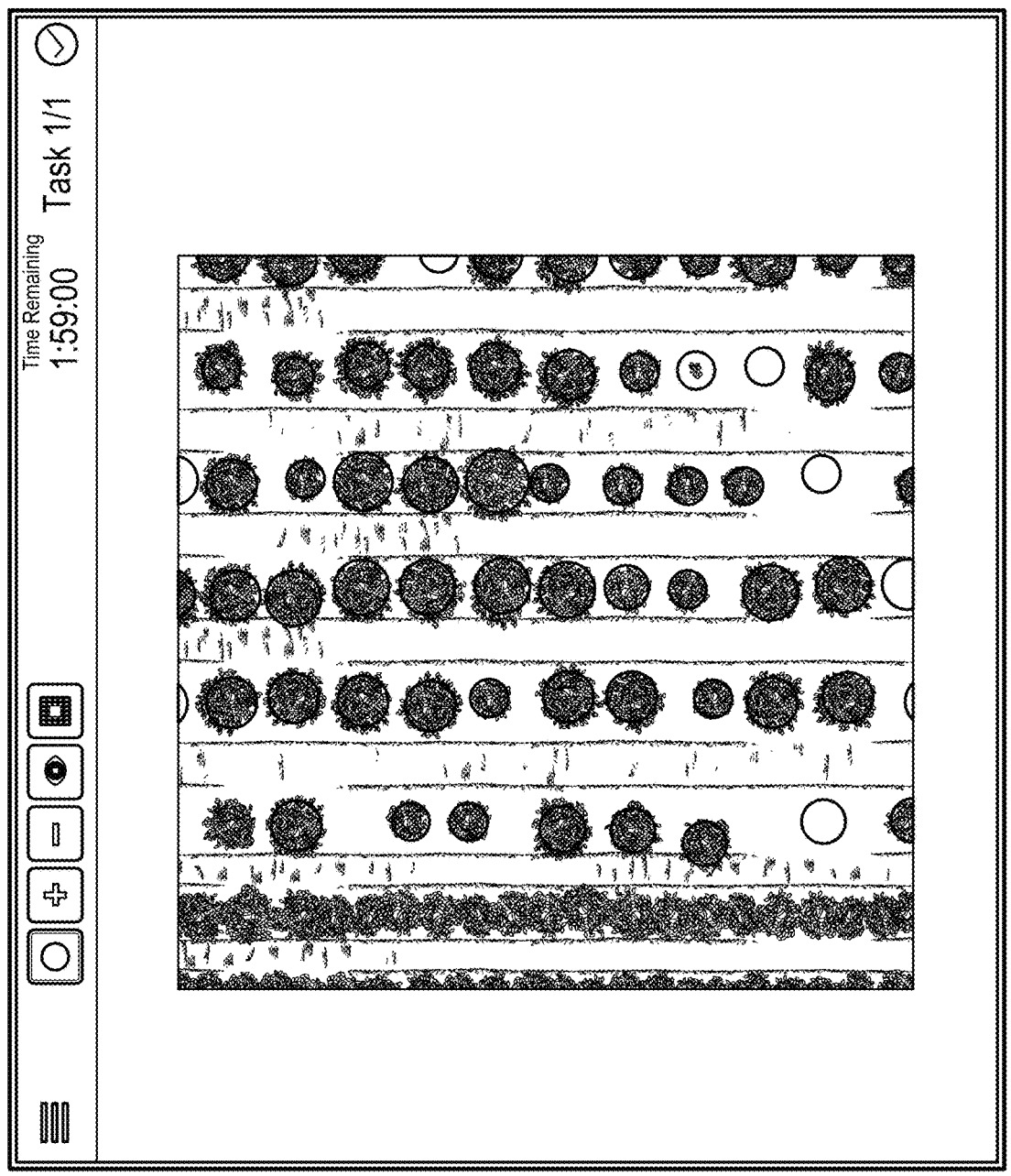
FIG. 10 illustrates an example user interface in accordance with some embodiments of the present disclosure.
Figure 11:
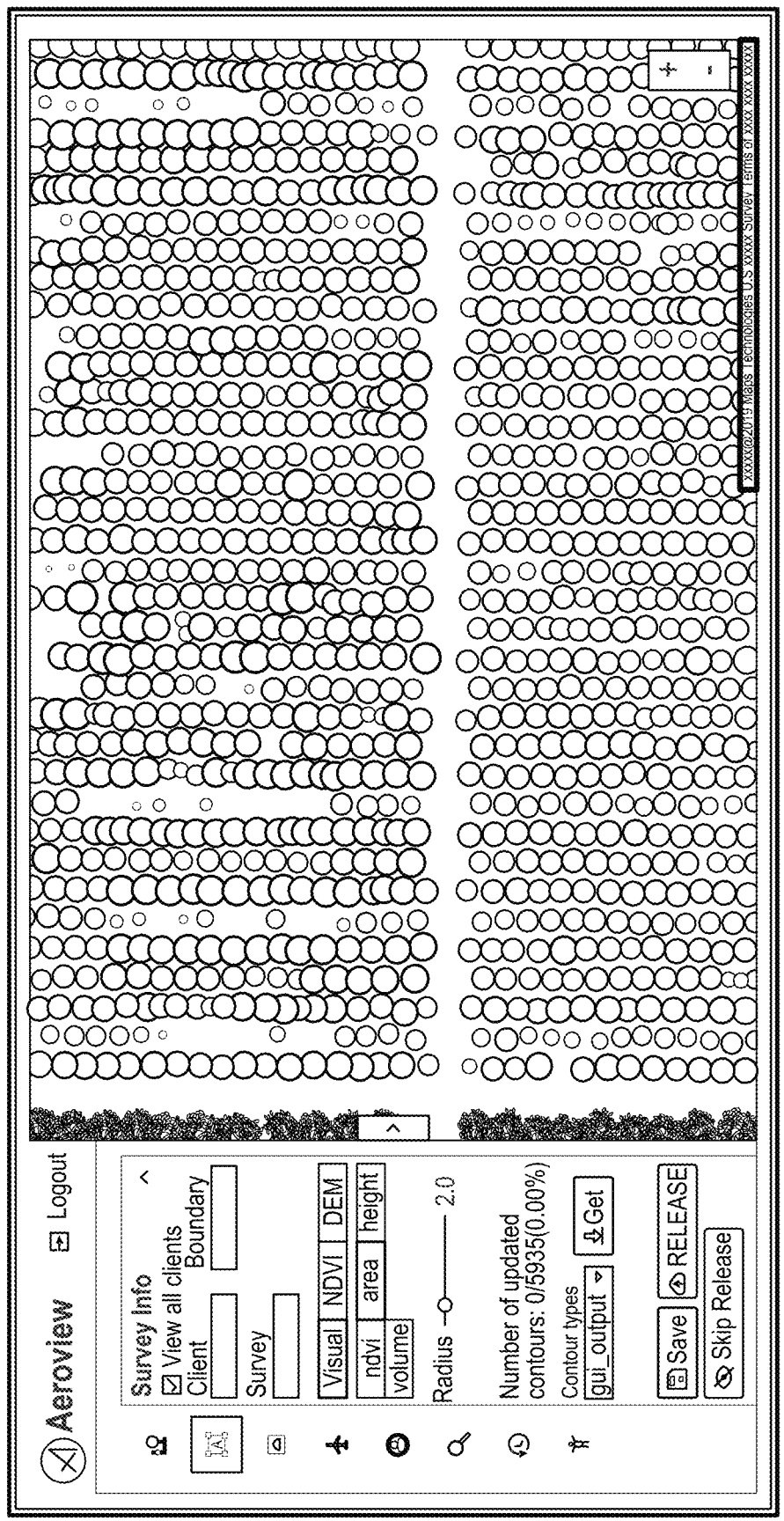
FIG. 11 illustrates an example user interface in accordance with some embodiments of the present disclosure.

FIG. 9-11 illustrate example user interfaces (e.g., graphical user interfaces) in accordance with some embodiments of the present disclosure.

The graphical user interface shown in FIG. 9 displays a birds' eye view of an agricultural plot (e.g., agricultural plot 100, FIG. 1). From the birds' eye view, it is apparent that different regions of the agricultural plot have different characteristics (growing conditions) that may affect yield. In some embodiments, the graphical user interface shown in FIG. 9 allows users to build new routes and visualize existing routes, so that representative paths through the agricultural plot are taken (flown over). Information obtained from the representative paths are, in some embodiments, combined with plot-wide information (e.g., information about the different growing conditions in different regions of the agricultural plot) to provide a more accurate estimate of the fruit yield for the entire plot.

FIG. 10 illustrates a graphical user interface in which a number of trees and the canopy areas of those individual trees are identified. In some embodiments, the fruit yield estimates described herein are scaled by the number and canopy areas of the trees in the agricultural plot.

FIG. 11 illustrates a graphical user interface in which different characteristics of individual trees (e.g., NDVI—normalized difference vegetation index, canopy area, tree height, and tree volume) can be visualized. For example, through the graphical user interface shown in FIG. 11, a user can toggle between these different characteristics of the individual trees. A size (e.g., radius) of the graphical representations of the individual trees is based on a value for the selected characteristic.

Figure 12A:
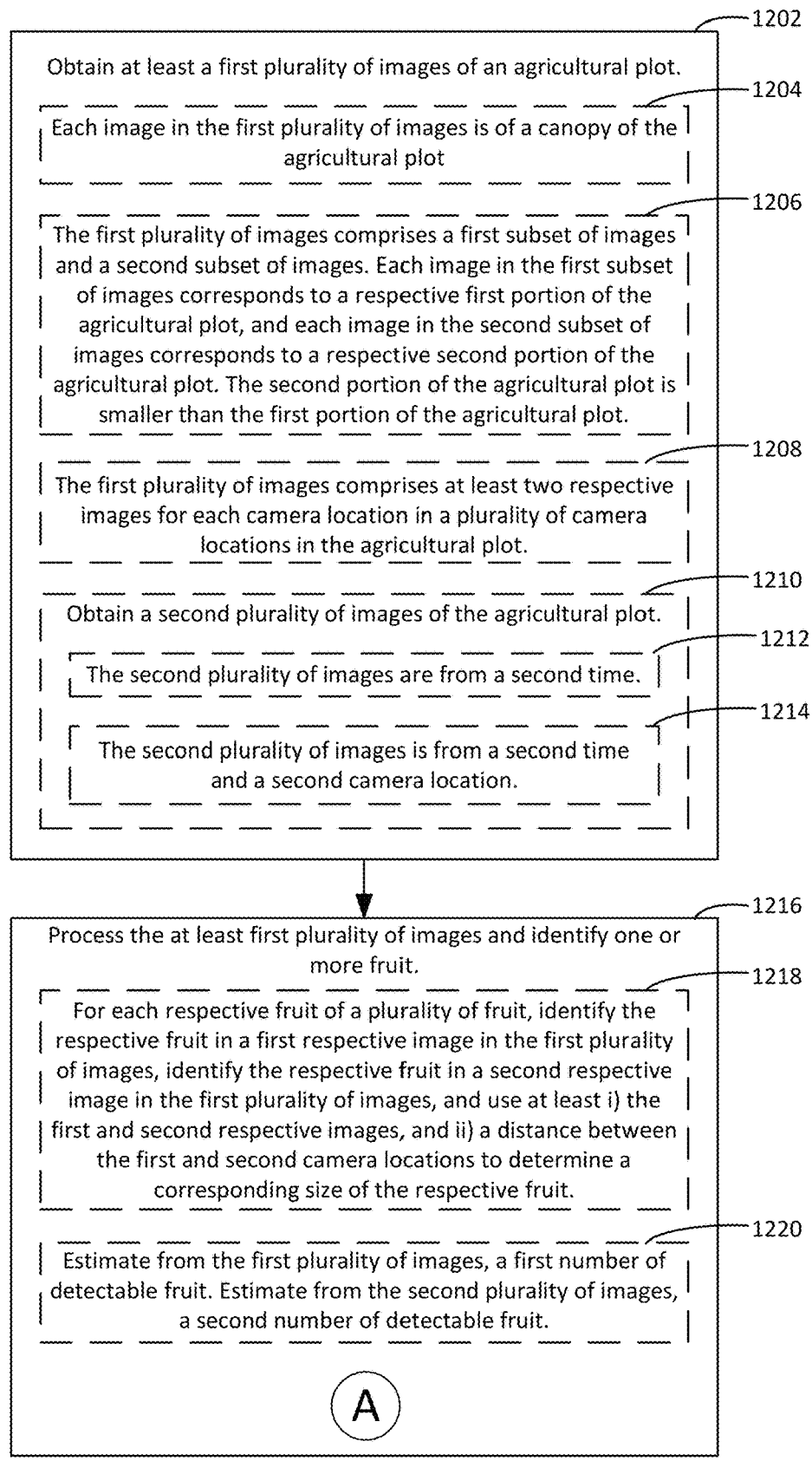
FIGS. 12A and 12B collectively illustrate a block diagram of method steps described herein, in accordance with some embodiments of the present disclosure, where boxes with dashed outlines represent optional steps.
Figure 12B:
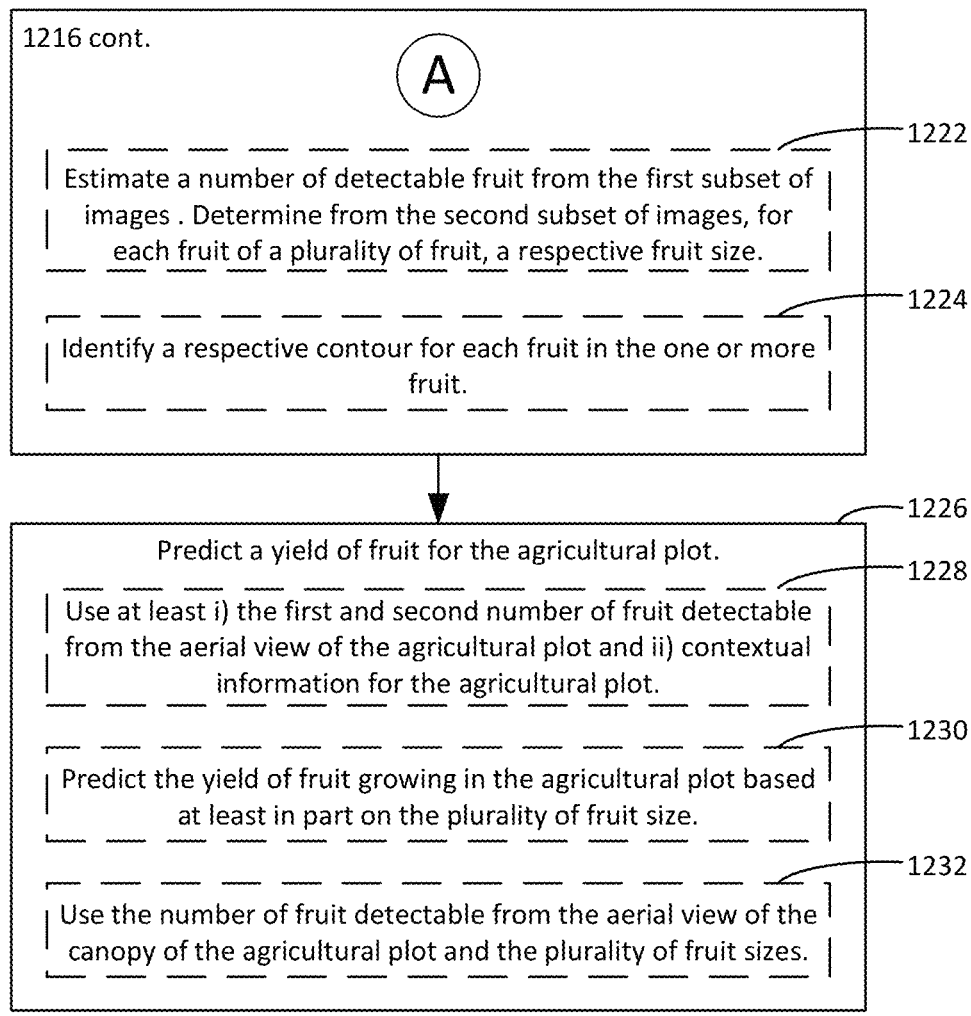

While systems and graphical user interfaces in accordance with the present disclosure have been disclosed above, methods in accordance with the present disclosure are now detailed with regards to FIGS. 12A and 12B.

Embodiments Directed Towards Predicting Fruit Size and/or Fruit Yield.

Multiple aspects of the present disclosure are provided for predicting yield of fruit for an agricultural plot.

In some embodiments, the fruit for which the yield of fruit is predicted are of a fruit type selected from the group consisting of blueberries, cherries, plums, peaches, nectarines, apricots, olives, mangos, pears, apples, quinces, loquats, citrus, figs, papayas, avocados, coconuts, durians, guavas, persimmons, and pomegranates. In some embodiments, the systems and methods described herein are equally applicable to other crops, such as non-fruit crops (e.g., corn, beans, brassicas, etc.).

Block 1202 of FIG. 12A. The method(s) proceed 1202 by obtaining at least a first plurality of images of an agricultural plot. In some embodiments, the method further comprises using a first vehicle (e.g., such as drone 202) to obtain the first plurality of images. In some embodiments, the method further comprises using a second vehicle (e.g., drone 202 or another vehicle) to obtain a second plurality of images. In some embodiments, the first vehicle is the same vehicle as the second vehicle. In some embodiments, the first vehicle is distinct from the second vehicle. In some embodiments, the first and/or second vehicle comprises a satellite. In some embodiments, the first and/or second vehicle comprises a drone. In some embodiments, the first vehicle is a satellite, and the second vehicle is a drone.

In some embodiments, the first and/or second vehicle (e.g., a drone and/or a satellite etc.) includes an RGB camera. In some embodiments, the first and/or second vehicle includes an RGB camera and each image in at least the first plurality of images comprises an RGB image. In some embodiments, each image in the second plurality of images comprises an RGB image.

One aspect of the present disclosure provides a method of predicting a yield of fruit growing in an agricultural plot using images from two or more time points. The method comprises obtaining, at a first time, a first plurality of images of a canopy of the agricultural plot from an aerial view of the canopy of the agricultural plot. The method also comprises obtaining, at a second time, a second plurality of images of the canopy of the agricultural plot from the aerial view of the canopy of the agricultural plot.

Another aspect of the present disclosure provides a method of predicting a yield of fruit growing in an agricultural plot from a plurality of fruit sizes, using two or more images to identify individual fruit and fruit sizes. The method comprises obtaining, using a camera, a first plurality of images of a canopy of the agricultural plot. The method further includes obtaining, using the camera, a second plurality of images of the canopy of the agricultural plot.

In some embodiments, the method further comprises obtaining a first route record for the first vehicle corresponding to the first plurality of images. In some embodiments, the method further comprises obtaining a second route record for the second vehicle corresponding to the second plurality of images.

Yet another aspect of the present disclosure provides a method of predicting a yield of fruit growing in an agricultural plot using images from multiple heights. The method comprises obtaining a first plurality of images of a canopy of the agricultural plot from an aerial view of the canopy of the agricultural plot. The first plurality of images includes a first subset of images and a second subset of images. The method further includes obtaining a first route record for the first vehicle corresponding to the first subset of images, and a second route record for the second vehicle corresponding to the second subset of images. Note that in some embodiments in which the first subset of images and the second subset of images were acquired on the same flight, the first route record and the second route record may be portions of a single route record. In some such embodiments, the first vehicle and the second vehicle are a same vehicle.

In some embodiments, the first and the second times are separated by at least 5 minutes, at least 10 minutes, or at least 30 minutes. In some embodiments, the first and the second times are separated by at least 1 hour, at least 2 hours, at least 4 hours, at least 6 hours, at least 8 hours, at least 10 hours, or at least 12 hours. In some embodiments, the first and the second times are separated by at least 1 day, at least 2 days, at least 3 days, at least 4 days, at least 5 days, or at least 6 days. In some embodiments, the first and the second times are separated by at least 1 week, at least 2 weeks, or at least 3 weeks. In some embodiments, the two or more time points are separated by at least 1 month, at least 2 months, at least 3 months, at least 4 months, at least 5 months, at least 6 months, at least 7 months, at least 8 months, at least 9 months, at least 10 months, at least 11 months, or at least 12 months.

In some embodiments, the first route record comprises i) a first route over the agricultural plot, and ii) a respective velocity of the first vehicle for each image in the first subset of images. In some embodiments, the second route record comprises i) a second route over the agricultural plot, and ii) a respective velocity of the second vehicle for each image in the second subset of images. In some embodiments, as described below, the first route record further comprises one or more additional features for each respective image in the first subset of images. Likewise, in some embodiments, the second route record further comprises one or more additional features for each respective image in the second subset of images.

In some embodiments, the first route record further comprises a respective height and a respective location (e.g., as determined by a GNSS—a Global Navigation Satellite System such as GPS, GLONASS, Galileo, Beidou (generally referred to as GPS throughout), IMU—inertial measurement unit, Kalman filtering, etc., or a combination thereof) for each image in the first subset of images, and each image in the first subset of images is evaluated for satisfaction of one or more validation criteria. In some embodiments, one or more images in the first subset of images that fail the one or more validation criteria are discarded. In some embodiments, the second route record further comprises a respective height and a respective location (e.g., detected by GPS, IMU—inertial measurement unit, Kalman filtering, etc., or a combination thereof) for each image in the second subset of images, and each image in the second subset of images is evaluated for satisfaction of one or more validation criteria. In some embodiments, one or more images in the second subset of images that fail the one or more validation criteria are discarded. In some embodiments, the one or more validation criteria comprise determining whether each image includes a respective fruit contour. In some embodiments, the one or more validation criteria comprise determining whether each image is in focus. In some embodiments, the first route record further comprises iii) a respective timestamp for each image in the first plurality of images. In some embodiments, the second route record further comprises iii) a respective timestamp in the second plurality of images.

Referring to block 1204, in some embodiments, each image in the first plurality of images is of a canopy of the agricultural plot. In some embodiments, the first plurality of images of the canopy of the agricultural plot comprises images of a plurality of plants growing in the agricultural plot. In some embodiments, the second plurality of images of the canopy of the agricultural plot comprises images of a plurality of plants growing in the agricultural plot.

Referring to block 1206, in some embodiments, the first plurality of images includes a first subset of images and a second subset of images. In some such embodiments, each image in the first subset of images corresponds to a respective first portion of the agricultural plot, and each image in the second subset of images corresponds to a respective second portion of the agricultural plot. In some embodiments, the second portion of the agricultural plot is smaller than the first portion of the agricultural plot (e.g., the first portion corresponds to the entire agricultural plot or a larger subset of the agricultural plot, while the second portion corresponds to a smaller subset of the agricultural plot). In some embodiments, each image in the first subset of images has a corresponding first resolution, and each image in the second subset of images has a corresponding second resolution, where the second resolution is higher than the first resolution.

In other words, in some embodiments, each image in the first subset of images corresponds to a respective lower-resolution image of a larger portion of the agricultural plot (e.g., a satellite image), while each image in the second subset of images corresponds to a respective higher-resolution images of a smaller portion of the agricultural plot (e.g., a close-up image of the canopy of the agricultural plot obtained by a drone).

In some embodiments, the first subset of images is obtained at a first height and the second subset of images is obtained from a second height. In some embodiments, the second height is different from the first height. In some embodiments, the second plurality of images includes a third subset of images, and a fourth subset of images. In some embodiments, each image in the third subset of images corresponds to a respective first portion of the agricultural plot, and each image in the fourth subset of images corresponds to a respective second portion of the agricultural plot. In some such embodiments, the second portion of the agricultural plot is smaller than the first portion of the agricultural plot. In some embodiments, each image in the third subset of images has a corresponding first resolution, and each image in the fourth subset of images has a corresponding second resolution, wherein the second resolution is higher than the first resolution. In some embodiments, the third subset of images is obtained at a first height and the fourth subset of images is obtained from a second height.

In some embodiments, each image in the first and second subsets of images comprises a respective RGB image. In some embodiments, each image in the third and fourth subsets of images comprises a respective RGB image.

In some such embodiments, the first height is at least 80 m above the canopy (e.g., above the agricultural plot). In some such embodiments, the second height is at least 3 m above the canopy (e.g., above the agricultural plot).

In some embodiments, the first height is at least 20 m, at least 30 m, at least 40 m, at least 50 m, at least 60 m, at least 70 m, at least 80 m, at least 90 m, or at least 100 m, above the canopy of one or more plants growing in the agricultural plot. In some embodiments, the first height is measured from a predefined reference height (e.g., ground level). For example, in some circumstances, the first height is 80 m above ground level. In some embodiments, images taken at the first height permit determination of plant sizes, characteristics of the entire agricultural plot, a number of fruit growing in the agricultural plot, and/or characteristics of multiple agricultural plots.

In some embodiments, the second height is at least 1 m, at least 2 m, at least 4 m, at least 5 m, at least 6 m, at least 7 m, at least 8 m, at least 9 m, or at least 10 m above the canopy of the one or more plants growing in the agricultural plot (or, alternatively, above the predefined reference height). In some embodiments, the second height is measured from ground level (e.g., 3 m above ground level). In some embodiments, the second height is at or below canopy level (e.g., may be at a height under the canopy level of one or more plants growing in the agricultural plot).

Referring to block 1208, in some embodiments, the first plurality of images comprises at least two respective images for each camera location in a plurality of camera locations in the agricultural plot.

Referring to block 1210, in some embodiments, the method(s) further comprise obtaining a second plurality of images of the agricultural plot. In some embodiments, with regards to block 1212, the second plurality of images is from a second time. In some embodiments, with regards to block 1214, the second plurality of images is from a second time and a second camera location.

Block 1216 of FIGS. 12A and 12B. The method(s) proceed 1216 by processing at least the first plurality of images and identifying one or more fruit.

Referring to block 1218, in another aspect of the present disclosure, the method further includes, for each respective fruit of a plurality of fruit growing in the agricultural plot, identifying 1218 the respective fruit in a first respective image in the first plurality of images, identifying the respective fruit in a second respective image in the first plurality of images, and using at least i) the first and second respective images and ii) a distance between the first and second camera locations to determine a corresponding size of the respective fruit. The first respective image has a corresponding first camera location, and the second respective image has a corresponding second camera location. In some embodiments, the distance between the first and second camera locations is determined using a route record. In some embodiments, the distance between the first and second camera locations is a distance traveled by a respective vehicle housing the respective camera (e.g., drone 202). In some embodiments, using a route record allows fruit sizes to be determined based on a disparity of the apparent fruit sizes in the two images, without the need for additional cameras onboard a respective vehicle (e.g., without the need for additional cameras to provide stereoscopic views of the fruit, since the stereoscopic views are obtained by moving the respective vehicle).

In some embodiments, the method further comprises using a depth of focus of the camera (e.g., an RGB camera on a UAV or other vehicle) to determine a corresponding size of each respective fruit. In some embodiments, a respective fruit size is determined via triangulation as described above. In some embodiments, the camera comprises a stereo camera.

Referring to block 1220, in one aspect of the present disclosure, the method further includes estimating, from the first plurality of images of the canopy of the agricultural plot obtained from the aerial view of the canopy of the agricultural plot, a first number of fruit detectable from the first plurality of images of the canopy of the agricultural plot. The method further includes estimating from the second plurality of images of the canopy of the agricultural plot obtained from the aerial view of the canopy of the agricultural plot, a second number of fruit detectable from the second plurality of images of the canopy of the agricultural plot.

Referring to block 1222, in yet another aspect of the present disclosure, the method further comprises estimating, from the first subset of images of the canopy of the agricultural plot obtained from the aerial view of the canopy of the agricultural plot, a number of fruit detectable from the plurality of images of the canopy of the agricultural plot. The method further includes determining, from the second subset of images, for each fruit of a plurality of fruit, a respective fruit size.

In some embodiments, the method further comprises estimating, from the first subset of images (e.g., based in part on the first route record), a respective plant size of each respective plant of a plurality of plants in the agricultural plot. In some embodiments, the method(s) further comprise estimating, from the second subset of images (e.g., based in part on the second route record), for each fruit of a plurality of fruit growing in the canopy of the agricultural plot, a respective fruit size.

In some embodiments, the first route record comprises i) a first route over (or alternatively through) the agricultural plot and ii) a respective velocity of the first vehicle for each image in the first plurality of images, and the second route record comprises i) a second route over (or alternatively through) the agricultural plot and ii) a respective velocity of the second vehicle for each image in the second subset of images.

In some embodiments, the second route comprises a subset (e.g., less than all) of plants (e.g., trees) growing in the agricultural plot. In some embodiments, the second route comprises a subset of the area (e.g., less than all) of the agricultural plot. In some such embodiments, the plurality of fruit comprises fruit growing on plants in a respective portion of the agricultural plot (e.g., fruits growing on the subset of plants).

In some embodiments, the second subset of images of the canopy of the agricultural plot includes two or more images obtained at different positions in the agricultural plot, where the two or more images include a respective fruit growing in the agricultural plot. In some embodiments, the method further comprises determining from the second subset of images, for each fruit (e.g., individual instance of a fruit) of a plurality of fruit growing on a subset of plants, a respective fruit size. In some embodiments, the method further comprises determining from the fourth subset of images, for each fruit of a plurality of fruit growing on a subset of plants, a respective fruit size.

In some embodiments, the subset of plants is predetermined (e.g., corresponding to a predetermined route through the agricultural plot or corresponding to one or more predetermined plants—e.g., reference plants). In some embodiments, the subset of plants is determined as those plants detected in the second and/or fourth subsets of images. In some embodiments, the subset of plants is random (e.g., if the route is not predetermined).

In some embodiments, the second and/or fourth subsets of images are used to determine tree sizes or other tree-specific features (e.g., such as tree size, tree health, etc.). In some embodiments, the first and/or third subsets of images are used to determine plot-wide characteristics. In some embodiments, the second and/or fourth subsets of images comprise images of a subset of the tress growing in the agricultural plot. In some embodiments, the method(s) further comprise determining, from the second and/or fourth subsets of images, for each fruit of the plurality of fruit growing on the plurality of plants, a respective fruit color.

In some embodiments, the method(s) further comprise determining respective fruit health for each fruit in the plurality of fruit detected in the agricultural plot.

Referring to block 1224 in FIG. 12B, in some embodiments, the method(s) further comprise identifying a respective contour for each fruit in the one or more fruit.

In some embodiments, the determining further comprises, for each respective fruit of the plurality of fruit (e.g., for each fruit identified in the second and/or fourth subset of images) using a first trained computational model applied to the two or more images that include the respective fruit, identifying a corresponding contour of the respective fruit in the respective two or more images. In some such embodiments, respective contours of the same fruit in the two or more images are thereby obtained. In some embodiments, the determining further comprises calculating a size of the respective fruit from the respective contours of the respective fruit in the two or more images.

In some embodiments, a second trained computational model (e.g., a validation model) is used to verify that each contour corresponds to a fruit (e.g., rather than a leaf). In some embodiments, contours that do not correspond to a fruit are discarded.

In some embodiments, two or more contours are identified as corresponding to a respective fruit based at least in part by matching the two or more contours based at least in part on one or more respective features for each contour. In some embodiments, the one or more respective features comprise color, texture, and/or shape determined for a corresponding contour (e.g., the color and texture for the corresponding contour comprises a color and texture for an area bounded by the contour, whereas the shape determined for the corresponding contour is the shape of the contour).

In some embodiments, calculating the respective fruit size for each fruit in the plurality of fruit includes assigning a respective fruit identifier for each fruit in the plurality of fruit, and averaging the size of each respective fruit across the plurality of images.

In some embodiments, a respective fruit size is calculated via stereo triangulation using two or more images including contours corresponding to the respective fruit, as explained above. In some embodiments, a respective fruit size is not determined using a composite image (e.g., fruit size is not determined by directly comparing contours for a respective fruit in two or images on a pixel-by-pixel basis).

Block 1226. The method(s) further includes predicting a yield of fruit for the agricultural plot. Referring to block 1228, in one aspect of the present disclosure, the method comprises, using at least i) the first and second number of fruit detectable from the aerial view of the canopy of the agricultural plot and ii) contextual information for the agricultural plot, predicting the yield of fruit from the agricultural plot. Referring to block 1230, in another aspect of the present disclosure, in some embodiments, the method further includes predicting a yield of fruit growing in the agricultural plot based at least in part on the plurality of fruit sizes. Referring to block 1232, in yet another aspect of the present disclosure, the method further includes using the number of fruit detectable from the aerial view of the canopy of the agricultural plot and the plurality of fruit sizes, to predict the yield of fruit from the agricultural plot.

In some embodiments, the method(s) further comprise obtaining historical yield information for the agricultural plot, and scaling the estimate of the yield of fruit from the agricultural plot using the historical yield information. In some embodiments, the scaling is non-linear. In some embodiments, historical yield information further comprises information on historical fruit sizes, and respective fruit sizes are scaled using the historical yield information. In some embodiments, historical data comprises fruit yield information from previous years. In some embodiments, historical data comprises historical data of a particular fruit type, historical data from a particular region (e.g., historical data for a plurality of agricultural plots), historical data for the agricultural plot, historical data for at least one different agricultural plot, or any combination thereof.

In some embodiments, the method further comprises scaling the predicted yield of fruit from the agricultural plot by a plurality of fruit sizes (e.g., by a plurality of fruit sizes obtained from historical data). In some embodiments, scaling the predicted yield of fruit by the plurality of fruit sizes is non-linear.

In some embodiments, the method further comprises determining, for each fruit in the plurality of fruit, a respective fruit weight based on the corresponding fruit size, and scaling the predicted yield of fruit by the plurality of fruit weights. For example, in some embodiments, the scaling comprises multiplying an estimated number of fruit by an average weight for the plurality of fruit, thereby providing a predicted yield in weight (e.g., tons) of fruit. In some embodiments, scaling the predicted yield of fruit by the plurality of fruit weights is non-linear.

In some embodiments, the method further comprises estimating a respective yield of fruit for each plant in the plurality of plants in the agricultural plot (e.g., a per tree yield). In some embodiments, this estimating comprises scaling the predicted yield of fruit for the agricultural plot by the number of plants detected. In some embodiments, this estimating comprises scaling the predicted yield of fruit from the agricultural plot using the plurality of plant sizes. In some embodiments, this estimating comprises scaling the predicted yield of fruit for the agricultural plot using at least the number of plants detected and the plurality of plant sizes. In some embodiments, the scaling is non-linear. In some embodiments, estimating a yield for each plant growing in the agricultural plot comprises determining a respective fruit count for each plant.

In some embodiments, the method further comprises providing a predicted count of fruit for the agricultural plot (e.g., based on an estimated count of fruit for each plant growing in the agricultural plot).

In some embodiments, the method further comprises displaying a histogram of the predicted yield of fruit. In some embodiments, this histogram is based at least in part on fruit size using the fruit sizes for the plurality of fruit (e.g., the histogram provides a count or percentage of fruit for each respective fruit size bin). FIG. 4 provides an example of one such histogram. In some embodiments, this histogram is based at least in part on plant size using the plant sizes for the plurality of plants (e.g., the histogram provides a count or percentage of fruit for each respective plant size bin, thereby providing information on the respective productivity of each plant size).

In some embodiments, the method is repeated at one or more time points over a season (e.g., monthly, weekly, etc.) to obtain updates of the predicted yield of fruit.

In some embodiments, the method further comprises providing a confidence value for the predicted yield of fruit from the agricultural plot (e.g., an accounting of the possible errors from estimated fruit sizes, estimated fruit counts, etc.).

In some embodiments, the method further comprises estimating for each tree detected in the first plurality of images, a respective number of fruit and, for each fruit growing in each tree a corresponding fruit size. In some such embodiments, the method further comprises scaling the predicted yield of fruit from the agricultural plot using the respective number of fruit and the corresponding fruit sizes for each tree in the first plurality of images. In some embodiments, scaling the predicted yield of fruit by the respective number of fruit and the plurality of fruit sizes is non-linear.

In some embodiments, respective plant sizes are estimated, using triangulation (as explained with reference to FIG. 8), from two or more images in the first plurality of images. In some embodiments, triangulation for determining plant size is based at least in part on the velocities in the first route record. In some embodiments, the estimate of respective fruit sizes is performed using triangulation, based at least in part on the velocities in the second route record. In some embodiments, respective plant health is determined for one or more plants growing in the agricultural plot.

In some embodiments, information for the agricultural plot further comprises historical yield information for a region corresponding to the agricultural plot (e.g., the surrounding area). In some embodiments, the additional information comprises current yield information for the region corresponding to the agricultural plot.

In some embodiments, the method further comprises providing a user report including fruit yield and/or other determined characteristics of the agricultural plot. In some embodiments, FIGS. 9, 10, and 11 correspond to respective user reports.

Embodiments for Training a Computational Model to Identify Fruit Contours.

In some embodiments, a method of training a computational model to identify fruit in agricultural plot images is provided. The method is performed at a computer system (e.g., server system 502) having one or more processors, and memory storing one or more programs for execution by the one or more processors. The method proceeds by obtaining, in electronic format, a training dataset. The training dataset comprises a plurality of training images from a plurality of agricultural plots.

Each training image is from a respective agricultural plot in the plurality of agricultural plots and comprises at least one identified fruit. The method further includes determining, for each respective fruit in each respective training image in the plurality of training images, a corresponding contour, and a corresponding fruit size. The method further includes training an untrained or partially trained computational model using at least the corresponding contour and corresponding fruit size for each respective fruit in each respective training image in the plurality of training images. The method thereby obtains a first trained computational model that is configured to identify fruit in agricultural plot images. The first trained computational model may be used in accordance with any of the embodiments described above.

In some embodiments, the first trained computational model is trained based at least in part on historical data comprising a plurality of training images obtained from a plurality of agricultural plots.

In some embodiments, the plurality of training images comprises at least 10 training images, at least 20 training images, at least 50 training images, at least 100 training images, at least 250 training images, at least 500 training images, at least 1000 training images, at least 2500 training images, or at least 5000 training images. In some embodiments, the plurality of training images is derived from a plurality of agricultural plots.

In some embodiments, the plurality of agricultural plots comprises at least 2 agricultural plots, at least 5 agricultural plots, at least 10 agricultural plots, at least 20 agricultural plots, at least 50 agricultural plots, or at least 100 agricultural plots. In some embodiments, each respective agricultural plot in the plurality of agricultural plots has a corresponding plurality of training images.

In some embodiments, the untrained or partially trained computational model (e.g., a machine learning model and/or an artificial intelligence (AI) model) is based on a neural network algorithm, a support vector machine algorithm, a decision tree algorithm, an unsupervised clustering algorithm, a supervised clustering algorithm, or a logistic regression algorithm. In some embodiments, the untrained or partially trained computational model is a multinomial classifier.

In some embodiments, the first trained computational model is updated (e.g., retrained) using at least one or more corrected fruit contours. In some embodiments, the first trained computational model is retrained one or more times (e.g., on a second plurality of training images). In some embodiments, one or more corrections are made to contours in one or more images in the first plurality of training images, and the one or more resulting contour corrections are used for retraining the trained computational model. In some embodiments, the one or more contour corrections are performed by a second trained computational model (e.g., a contour validation model).

In some embodiments, the second trained computational model is based on a neural network algorithm, a support vector machine algorithm, a decision tree algorithm, an unsupervised clustering algorithm, a supervised clustering algorithm, or a logistic regression algorithm. In some embodiments, the second trained computational model is a multinomial classifier.

In some embodiments, the first and/or second computational model is a neural network or a convolutional neural network. Examples of neural networks are provided by Tajbakhsh et al. 2016 "Convolutional neural networks for medical image analysis: Full training or fine tuning?" IEEE Transactions on Medical Imaging 35(5), 1299-1312 and Larochelle et al., 2009, "Exploring strategies for training deep neural networks" J Mach Learn Res 10, 1-40, each of which is hereby incorporated by reference.

In some embodiments, the first and/or second computational model is a support vector machine (SVM). Example SVMs are described in Tong and Chang 2001 "Support vector machine active learning for image retrieval" Proc. 9th ACM Int. Conf. Multimedia 107-118; Noble 2006 "What is a support vector machine?" Nat. Biotech 24(12), 1565-1567; and Fung and Mangasarian 2005 "Multicategory Proximal Support Vector Machine Classifiers" Mach. Learning 59, 77-97, each of which is hereby incorporated by reference in its entirety. When used for classification, SVMs separate a given set of binary-labeled data with a hyperplane that is maximally distant from the labeled data. For cases in which no linear separation is possible, SVMs can be used in combination with one or more kernels, which automatically realizes a non-linear mapping to a feature space. The hyperplane determined by an SVM in feature space corresponds to a non-linear decision boundary in the input space.

In some embodiments, the first and/or second computational model is a decision tree or random forest. In some embodiments, the decision tree is random forest regression. Decision trees are described by Friedl and Brodley 1997 "Decision tree classification of land cover from remotely sensed data" Remote Sens. Environ. 61(3), 399-409, and random forests for analysis of image data are described in Gislason et al. 2005 "Random Forests for land cover classification" Pat. Recog. Let. 27, 294-300, which are hereby incorporated by reference. Tree-based methods partition the feature space into a set of rectangles, and then fit a model (e.g., a constant) to each one.

Particular exemplary clustering techniques that can be used in the present disclosure include, but are not limited to, hierarchical clustering (agglomerative clustering using nearest-neighbor algorithm, farthest-neighbor algorithm, the average linkage algorithm, the centroid algorithm, or the sum-of-squares algorithm), k-means clustering, fuzzy k-means clustering algorithm, and Jarvis-Patrick clustering. In some embodiments, the clustering comprises unsupervised clustering where no preconceived notion of what clusters should form when the training set is clustered is imposed.

In some embodiments, the first and/or second computational model comprises a regression model. In some embodiments, the computational model makes use of a regression model disclosed in Hastie et al., 2001, The Elements of Statistical Learning, Springer-Verlag, New York, which is hereby incorporated by reference in its entirety.

In some embodiments, a same computational model is used as both the first and second computational model. In some embodiments, the first computational model is different from the second computational model.

Plural instances may be provided for components, operations, or structures described herein as a single instance. Finally, boundaries between various components, operations, and data stores are somewhat arbitrary, and particular operations are illustrated in the context of specific illustrative configurations. Other functional allocations are envisioned and may fall within the scope of the presently described implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms first, second, etc. may be used herein to describe various elements, these elements should not be limited by these terms. These terms are only used to distinguish one element from another. For example, a first widget could be termed a second widget, and, similarly, a second widget could be termed a first widget, without departing from the scope of the present disclosure. The first subject and the second subject are both widgets, but they are not the same widget.

The terminology used in the present disclosure is intended to describe particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises," "comprising," "including," "includes," "having," "has," "with," or variants thereof when used in this specification or claims, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting (the stated condition or event (" or "in response to detecting (the stated condition or event)," depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures, and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, thereby enabling others skilled in the art to best utilize the implementations and various implementations with various modifications as are suited to the particular use contemplated.

What is claimed:

1. A method of estimating a yield of fruit growing in an agricultural plot, comprising:
    obtaining, at a first position, a first plurality of images of a canopy of the agricultural plot from a first view of the canopy of the agricultural plot;
    estimating, from the first plurality of images of the canopy of the agricultural plot obtained from the first view of the canopy of the agricultural plot, a first number of fruit detectable from the first plurality of images of the canopy of the agricultural plot;
    obtaining, at a second position, distinct from the first position, a second plurality of images of the canopy of the agricultural plot from a second view of the canopy of the agricultural plot;
    estimating from the second plurality of images of the canopy of the agricultural plot obtained from the second view of the canopy of the agricultural plot, a second number of fruit detectable from the second plurality of images of the canopy of the agricultural plot; and
    estimating a yield of fruit and a fruit size, where the yield of fruit is based on a scaling factor to determine an estimate of fruit yield that includes fruit not visible in the first plurality of images and the second plurality of images, wherein:
        the estimation of the yield of fruit includes an estimated distribution of fruit sizes, and
        the estimation of the yield of fruit includes scaling the estimated yield of fruit from the agricultural plot based on the estimated distribution of fruit sizes.

2. The method of claim 1, wherein estimating the yield of fruit from the agricultural plot further comprises estimating a respective yield of fruit for each plant in a plurality of plants in the agricultural plot.

3. The method of claim 1, wherein the first plurality of images includes a first subset of images and a second subset of images, wherein:
    each image in the first subset of images corresponds to a respective first portion of the agricultural plot,
    each image in the second subset of images corresponds to a respective second portion of the agricultural plot, and
    the second portion of the agricultural plot is smaller than the first portion of the agricultural plot.

4. The method of claim 3, wherein:
    each image in the first subset of images has a corresponding first resolution, and each image in the second subset of images has a corresponding second resolution, and
    the second resolution is higher than the first resolution.

5. The method of claim 3, wherein the first subset of images is obtained at a first height and the second subset of images is obtained at a second height, different from the first height.

6. The method of claim 3, further comprising determining from the second subset of images, for each fruit of a plurality of fruit growing on a subset of plants, a respective fruit size.

7. The method of claim 6, further comprising determining, for each fruit in the plurality of fruit, a respective fruit weight based on the respective fruit size, and scaling the estimated yield of fruit by the respective fruit weights.

8. The method of claim 3, wherein the second plurality of images includes a third subset of images and a fourth subset of images, wherein:
    each image in the third subset of images corresponds to the respective first portion of the agricultural plot, and
    each image in the fourth subset of images corresponds to the respective second portion of the agricultural plot.

9. The method of claim 8, wherein:
    each image in the third subset of images has a corresponding first resolution, and each image in the fourth subset of images has a corresponding second resolution, and
    the second resolution is higher than the first resolution.

10. The method of claim 8, wherein the third subset of images is obtained at a first height and the fourth subset of images is obtained from a second height, different from the first height.

11. The method of claim 8, further comprising determining from the fourth subset of images, for each fruit of a plurality of fruit growing on a subset of plants, a respective fruit size.

12. The method of claim 1, further comprising:
    for each respective fruit of a plurality of fruit, using a first trained computational model applied to two or more images that include a respective fruit, identifying a corresponding contour of the respective fruit in the respective two or more images, thereby obtaining respective contours of the same fruit in the two or more images; and
    calculating a size of the respective fruit from the respective contours of the respective fruit in the two or more images.

13. The method of claim 12, wherein calculating the respective fruit size for each fruit in the plurality of fruit includes assigning a respective fruit identifier for each fruit in the plurality of fruit.

14. The method of claim 12, wherein a second trained computational model is used to verify that each contour corresponds to a fruit, and contours that do not correspond to a fruit are discarded.

15. The method of claim 1, further comprising:
    obtaining historical yield information for the agricultural plot; and
    scaling the estimated yield of fruit from the agricultural plot using the historical yield information.

16. The method of claim 1, further comprising using a first vehicle to obtain the first plurality of images and a second vehicle to obtain the second plurality of images, wherein the first vehicle is a satellite, and the second vehicle is a drone.

17. A computer system, comprising:
one or more processors; and
memory storing one or more programs, the one or more programs including instructions for:
obtaining, at a first position, a first plurality of images of a canopy of an agricultural plot from a first view of the canopy of the agricultural plot;
estimating, from the first plurality of images of the canopy of the agricultural plot obtained from the first view of the canopy of the agricultural plot, a first number of fruit detectable from the first plurality of images of the canopy of the agricultural plot;
obtaining, at a second position, distinct from the first position, a second plurality of images of the canopy of the agricultural plot from a second view of the canopy of the agricultural plot;
estimating from the second plurality of images of the canopy of the agricultural plot obtained from the second view of the canopy of the agricultural plot, a second number of fruit detectable from the second plurality of images of the canopy of the agricultural plot; and
estimating a yield of fruit and a fruit size, where the yield of fruit is based on a scaling factor to determine an estimate of fruit yield that includes fruit not visible in the first plurality of images and the second plurality of images, wherein:
the estimation of the yield of fruit includes an estimated distribution of fruit sizes, and
the estimation of the yield of fruit includes scaling the estimated yield of fruit from the agricultural plot based on the estimated distribution of fruit sizes.

18. A non-transitory computer-readable storage medium storing one or more programs, which, when executed by a computer system with one or more processors, cause the one or more processors to perform a set of operations, comprising:
obtaining, at a first position, a first plurality of images of a canopy of an agricultural plot from a first view of the canopy of the agricultural plot;
estimating, from the first plurality of images of the canopy of the agricultural plot obtained from the first view of the canopy of the agricultural plot, a first number of fruit detectable from the first plurality of images of the canopy of the agricultural plot;
obtaining, at a second position, distinct from the first position, a second plurality of images of the canopy of the agricultural plot from a second view of the canopy of the agricultural plot;
estimating from the second plurality of images of the canopy of the agricultural plot obtained from the second view of the canopy of the agricultural plot, a second number of fruit detectable from the second plurality of images of the canopy of the agricultural plot; and
estimating a yield of fruit and a fruit size, where the yield of fruit is based a scaling factor to determine an estimate of fruit yield that includes fruit not visible in the first plurality of images and the second plurality of images, wherein:
the estimation of the yield of fruit includes an estimated distribution of fruit sizes, and
the estimation of the yield of fruit includes scaling the estimated yield of fruit from the agricultural plot based on the estimated distribution of fruit sizes.

* * * * *